United States Patent
Leiba et al.

(10) Patent No.: US 8,406,126 B1
(45) Date of Patent: Mar. 26, 2013

(54) RING-LIKE COMMUNICATION ARCHITECTURE

(75) Inventors: Yigal Leiba, Holon (IL); Izhak Kirshenbaum, Rosh HaAyin (IL); Leonid Shousterman, Alphei Menashe (IL)

(73) Assignee: Siklu Communication Ltd., Petach-Tikva (IL)

( * ) Notice: Subject to any disclaimer, the term of this patent is extended or adjusted under 35 U.S.C. 154(b) by 230 days.

(21) Appl. No.: 12/872,968

(22) Filed: Aug. 31, 2010

(51) Int. Cl.
*H04J 1/16* (2006.01)
*H04L 12/28* (2006.01)

(52) U.S. Cl. ........ 370/222; 370/401

(58) Field of Classification Search ........ 370/221, 370/222, 223, 225, 401, 404, 452, 406, 460
See application file for complete search history.

(56) References Cited

U.S. PATENT DOCUMENTS

| | | | |
|---|---|---|---|
| 6,324,180 B1 | 11/2001 | Du | |
| 6,760,302 B1 | 7/2004 | Ellinas et al. | |
| 6,973,315 B1 | 12/2005 | Miernik et al. | |
| 7,535,932 B2 | 5/2009 | Ishii et al. | |
| 2002/0093296 A1* | 7/2002 | Belliveau | 315/294 |
| 2003/0095537 A1* | 5/2003 | Murakami et al. | 370/349 |
| 2007/0089163 A1* | 4/2007 | Denton | 726/2 |
| 2008/0305743 A1* | 12/2008 | Aithal et al. | 455/67.11 |
| 2009/0141631 A1* | 6/2009 | Kim et al. | 370/235 |
| 2010/0214911 A1* | 8/2010 | Cooke et al. | 370/229 |

* cited by examiner

*Primary Examiner* — Andrew Lee

(57) ABSTRACT

A system for fault-tolerant communication includes N nodes, out of which one is a gateway node, and N data links, each data link connecting two of the nodes, forming a ring structure. At least two of the data links are wireless data links. The system substantially do not use one of the wireless data links to send data, effectively partitioning the ring structure into a first chain and a second chain. The system sends data downstream direction and upstream direction, through the first and second chains. The system detaches at least one node from the first chain, by substantially stop using a wireless data link having a reduction in performance and belonging to the first chain, and connects the at least one node to the second chain by starting to use the wireless data link that was substantially not in use.

20 Claims, 20 Drawing Sheets

| Modulation | Rate | Minimal required reception power at the receiver |
|---|---|---|
| QPSK | 1/2 | −78dBm |
| QPSK | 3/4 | −75dBm |
| 16QAM | 1/2 | −72dBm |
| 16QAM | 3/4 | −68dBm |
| 64QAM | 1/2 | −66dBm |
| 64QAM | 2/3 | −64dBm |
| 64QAM | 3/4 | −62dBm |
| 64QAM | 5/6 | −60dBm |

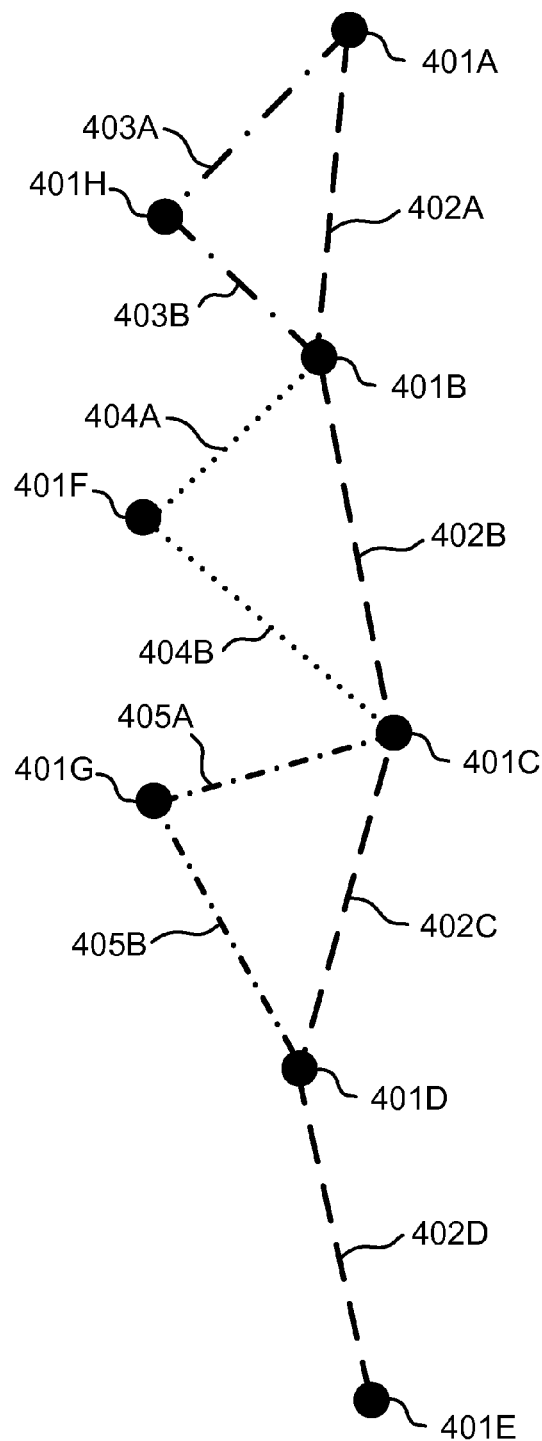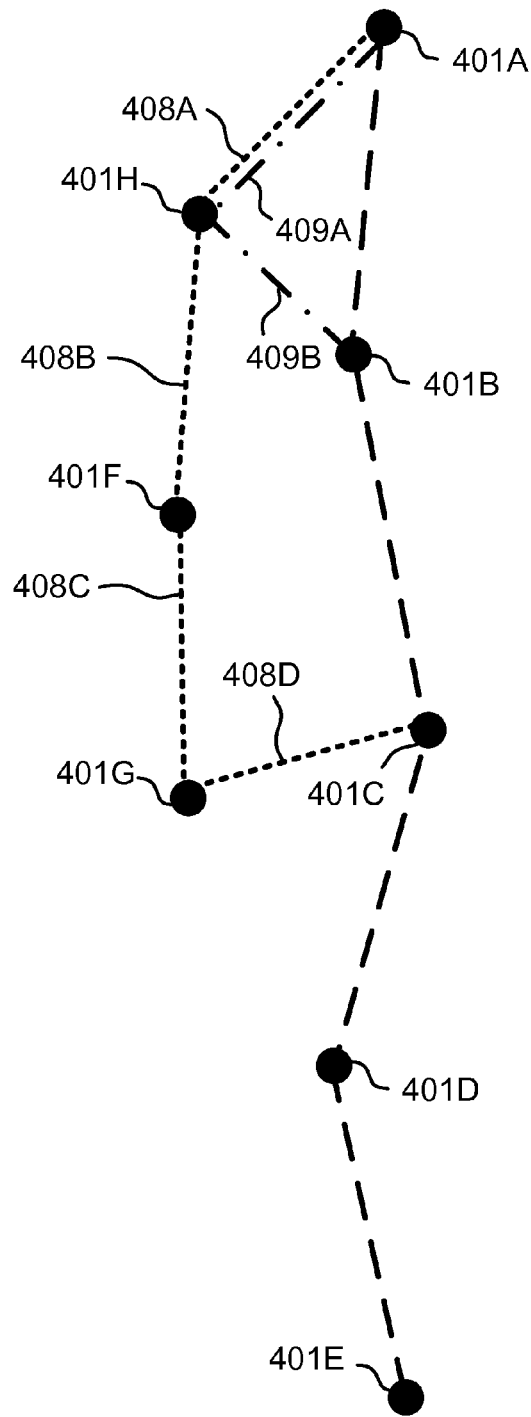
FIG. 4A
FIG. 4B

RING-LIKE COMMUNICATION ARCHITECTURE

TECHNICAL FIELD

Some of the disclosed embodiments relate to communication systems and networking, and more specifically to ring-like communication architecture.

BACKGROUND

Fixed wireless networks transmit data point-to-point through the air over a terrestrial microwave platform rather than through copper or optical fiber and typically use a directional radio antenna on each end of a wireless link. These antennas are designed for outside use and to accommodate various weather conditions, distances and bandwidths. The antennas are usually selected to make the beam as narrow as possible and thus focus transmit power to their destination, increasing reliability and reducing the chance of eavesdropping or data injection. The links are usually arranged as a point-to-point setup to permit the use of these antennas. The point-to-point setup also permits the link to have better capacity and/or better reach for the same amount of power. Unlike wired networks, the quality of service and capacity between two points on a wireless network may fluctuate due to weather conditions or background transmissions. Millimeter waves suffer specifically from signal absorption due to fog or rain and, millimeter waves in the 60 GHz range suffer from the effects of oxygen absorption as well.

SUMMARY

In one embodiment, a system for fault-tolerant communication includes N nodes, out of which one is a gateway node, and N data links, each data link connecting two of the nodes, forming a ring structure comprising at least four nodes. At least two of the data links are wireless data links. The system substantially do not use one of the wireless data links to send data, effectively partitioning the ring structure into a first chain and a second chain, each chain connected to the gateway node. The system sends data downstream direction, from the gateway node, through the first and second chains, and sends data upstream direction, to the gateway node, through the first and second chains. The system detaches at least one node from the first chain, by substantially stop using a wireless data link having a reduction in performance and belonging to the first chain, and connects the at least one node to the second chain by starting to use the wireless data link that was substantially not in use. The at least one node that was detached and connected adjusts to the downstream direction and upstream direction of the second chain. In one embodiment, all the data links are wireless data links. In one embodiment, the wireless data link having the reduction in performance is a data link previously sustaining a first data rate, and currently sustaining only a second data rate as a result of an event. Optionally, the second data rate is less than 80% of the first data rate. In one embodiment, the wireless data link having the reduction in performance is a millimeter-wave data link connecting two of the nodes. Optionally, the millimeter-wave data link includes two directional antennas located at the two of the nodes, and the two directional antennas have a line of sight with each-other. In one embodiment, the millimeter-wave data link operates at a frequency between 57 GHz and 86 GHz. In one embodiment, the event is an atmospheric event, such as fog, rain, or dust. In one embodiment, the event is a malfunction in one of the nodes operating the wireless data link having the reduction in performance. In one embodiment, the malfunction causes the data link having the reduction in performance to become inoperative. In one embodiment, the wireless data links are used asymmetrically, such that the downstream direction is allocated with more wireless communication bandwidth than the upstream direction. In one embodiment, the wireless data links use Time Division Duplex (TDD), and the downstream direction is allocated more transmission time than the upstream direction. In one embodiment, the at least one node that was detached from the first chain and connected to the second chain adjusts to the downstream direction and upstream direction of the second chain, by allocating the downstream direction of the second chain more transmission time than the upstream direction of the second chain.

In one embodiment, the nodes are backhaul nodes, delivering data to Radio Access nodes belonging to a Radio Access Network (RAN). In one embodiment, the wireless data links are millimeter-wave Point-to-Point links. In one embodiment, the system continues working at substantially full capacity after any first malfunction affecting any of the data links or any of the wireless data links. In one embodiment, the system selects the one of the wireless data links that is substantially not in use by comparing wireless performance of all the wireless data links, and substantially stop using the wireless data link having the worse wireless communication performance. In one embodiment, the wireless performance may be data transmission rate, packet loss, latency, or latency jitter. In one embodiment, the selection is done periodically. In one embodiment, the ring structure includes at least 3 nodes, and the first chain includes only the gateway node after detaching the at least one node from the first chain. In one embodiment, the ring structure includes at least 3 nodes, and the second chain includes only the gateway node before detaching the at least one node from the first chain.

In one embodiment, a method for achieving fault-tolerant communication includes (i) operating a ring structure having N nodes out of which one is a gateway node, and N data links each data link connecting two of the nodes, forming the ring structure, wherein at least two of the data links are wireless data links, (ii) substantially not using one of the wireless data links to send data, effectively partitioning the ring structure into a first chain and a second chain, each chain connected to the gateway node, (iii) sending data downstream direction, from the gateway node, through the first and second chains, (iv) sending data upstream direction, to the gateway node, through the first and second chains, (v) detaching at least one node from the first chain, by substantially stop using a wireless data link having a reduction in performance and belonging to the first chain, (vi) connecting the at least one node to the second chain by starting to use the wireless data link that was substantially not in use, and (vii) adjusting the at least one node, which was detached and connected, to the downstream direction and upstream direction of the second chain.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 4A illustrates one embodiment of a logical representation of a network including interconnected nodes;

FIG. 4B illustrates one embodiment of a logical representation of a network including interconnected nodes, and two overlapping protection paths;

DETAILED DESCRIPTION

Figures 1A, 1B:
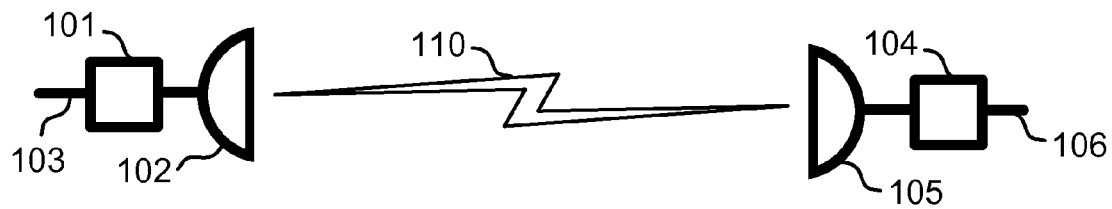
FIG. 1A illustrates one embodiment of a point-to-point wireless system.
FIG. 1B illustrates one embodiment of an Adaptive Coding and Modulation (ACM) table.

FIG. 1A illustrates one embodiment of a point-to-point wireless system. A wireless link 110 is established, using two directional antennas 102 and 105. The nodes 101 and 104 drive the wireless link from one end to the other, and may be connected to a network by a connection 103 and 106 such as Ethernet connection. In one embodiment, nodes 101 and 104 may function as Ethernet switches. A packet of Ethernet received via connection 103 may be switched by node 101 and wirelessly transmitted via antenna 102. In one embodiment, the wireless link 110 operates at high frequency such as 70 GHz and each antenna is high gain such as 40 dBi.

Adaptive Coding and Modulation (ACM), sometimes referred to as Link Adaptation, is a term used in wireless communications to denote the matching of the modulation, coding and other signal and protocol parameters to the conditions on the radio link (e.g. the path-loss, the interference due to signals coming from other transmitters, weather conditions and other sources). FIG. 1B illustrates one embodiment of an ACM table. The table states a minimal power level required at the receiver for a given modulation and rate. By way of example, a radio system is operating at 70 GHz. The received signal power at the receiver is −66 dBm and the signal is encoded using rate ½ 64QAM. The data rate is 600 Mbps. The signal power is then reduced to −78 dBm due to rain along the path of the signal. The system then responds by switching to rate ½ QPSK encoding. The data rate is reduced to 200 Mbps.

Figure 1C:
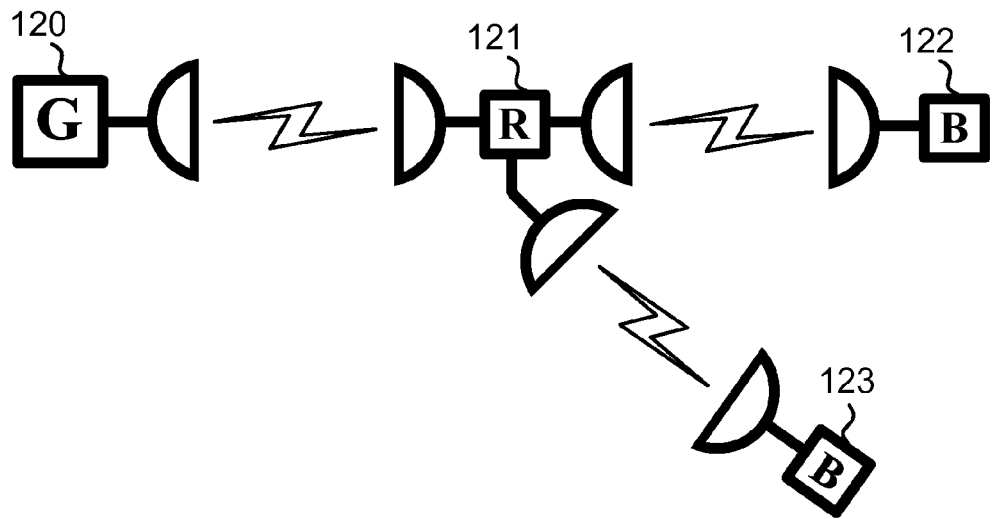
FIG. 1C illustrates one embodiment of system with multiple nodes and wireless links forming a network.
Figure 1D:
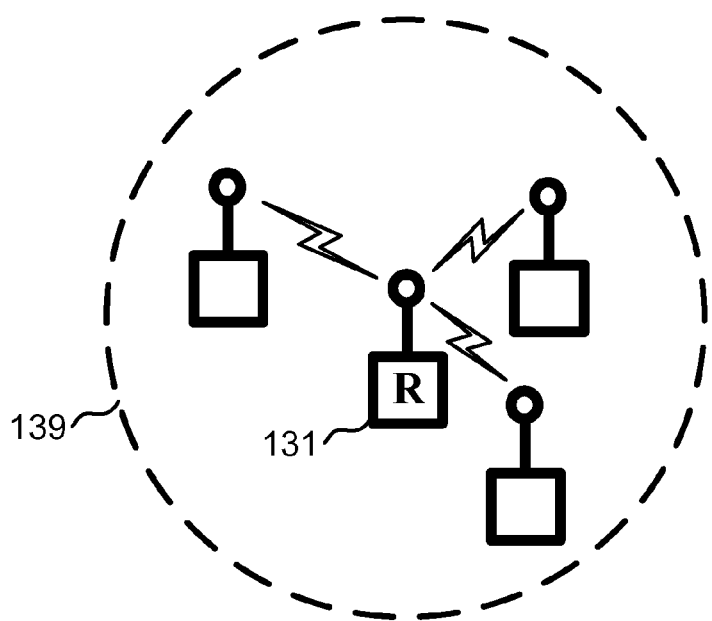
FIG. 1D illustrates one embodiment of a node acting as a relay, using an Omni-directional antenna to form a network.

FIG. 1C illustrates one embodiment of a system with multiple nodes and wireless links forming a network, such as a Layer-2 (L2) Ethernet. Node 121 receives packets from node 120, which may be a Gateway, via a wireless Point-to-Point link, and relays (or switches) the packets to either a node 122 or node 123, which may function as Base-Stations. Typically, nodes 120, 122, and 123 are bi-directional, allowing any of nodes 120, 122, 123 to transmit data to any of nodes 120, 122, 123 using node 121 acting as a relay. Similarly, additional nodes and nodes acting as relays may be added to create larger networks. A simple configuration called Line Topology includes two remote nodes connected by a linear series of nodes relaying the transmitted data from one node to the other. More complex networks allow more flexible and efficient coverage of multiple sites. A Tree Topology involves a root node linked to one or more nodes, each one of these nodes reconnecting to an additional one or more nodes and so on, effectively connecting the root node to a large number of nodes trough a series of branches. A Tree Topology does not contain loops. Another topology called Ring Topology involves multiple nodes each connecting to exactly two neighbor nodes. Complex networks may combine Line, Tree, Ring, Mesh and other Topologies. Telecommunication networks transporting data from remote sites to a primary location such as a root node are often called Backhaul networks. One example of a Backhaul network in the field of cellular communications involves relays being used to transport information from a gateway to base stations. Networks may combine both wired and wireless communications based on the distance, environment, security and data rates required among nodes. A wired network section uses fiber optic, Coax or other type of cable to connect two nodes. Nodes are not limited to using directional wireless links. FIG. 1D illustrates one embodiment of a node 131 acting as a relay, using an Omni-directional antenna to form a network. Node 131 may use the Omni-directional antenna to link to any node within the pattern/range 139.

In one embodiment, a method for protection switching in radio networks includes the following steps: Establishing a primary path and a protection path for Layer-2 (L2) communication between a first node and a second node, the primary path comprising two links successively connected by a relay node, and at least one of the links is a wireless link. Assigning a first L2 Virtual Circuit (VC) to the primary path, and a second L2 VC to the protection path. Mapping, by the first node, a first class of service (CoS) and a second CoS to the first L2 VC. Transporting packets of L2 associated with the two CoS, from the first node to the second node, via the primary path. Detecting, by a node associated with the wireless link, a reduction in performance of the wireless link. And, as a reaction to the detection, re-mapping the second CoS to the second L2 VC, by the first node, in order to transport packets associated with the second CoS to the second node via the protection path.

Figure 2A:
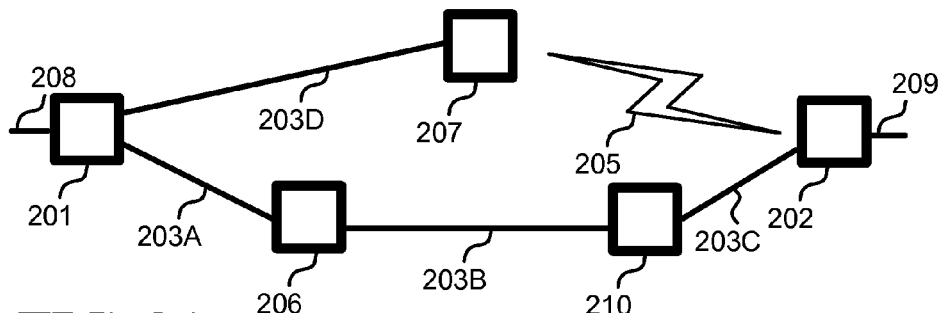
FIG. 2A illustrates one embodiment of a network including wireless links.

FIG. 2A illustrates one embodiment of protection switching in radio networks. A physical data network includes nodes 201, 202, 206, 210, 207 and links 203A, 203B, 203C, 203D, 205. At least one link is a wireless link 205. Other links may be wired or wireless. Data from a network connection 208 may be transmitted to another network connection 209 or vice versa. Data may travel through multiple Layer-2 (L2) paths. In one embodiment, data may travel through node 207 or through nodes 206 and 210. Data may travel in either path, or in both simultaneously. In one embodiment, a given data packet may travel through only one of the paths at a given time. In one embodiment, node 201 is a base station, node 202 is a gateway, nodes 207, 206, 210 are Layer-2 switches and the entire system is a backhaul system.

In one embodiment, the path from node 201 to node 202 through node 207 is the primary path and is assigned a first L2 Virtual Circuit (VC) and the path from node 201 to node 202 through nodes 206, 210 is the protection path and assigned a second L2 VC. In one embodiment the L2 VC are Ethernet L2 VC transporting Ethernet packets. In one embodiment the Ethernet L2 VC are Virtual Local Area Networks (VLAN). When packet data is traveling from node 201 to node 202, node 201 determines which path each data packet is sent through. It is noted that data may comprise packets, and may be referred to as data packets or simply packets. Data traveling through the network may have different priority levels. In one embodiment, data with high priority may be assigned a first class of service (CoS) and data with a lower priority may be assigned a second CoS. According to one example, a network is transferring high-priority video conference data as well as transferring low-priority files using FTP.

Figure 2B:
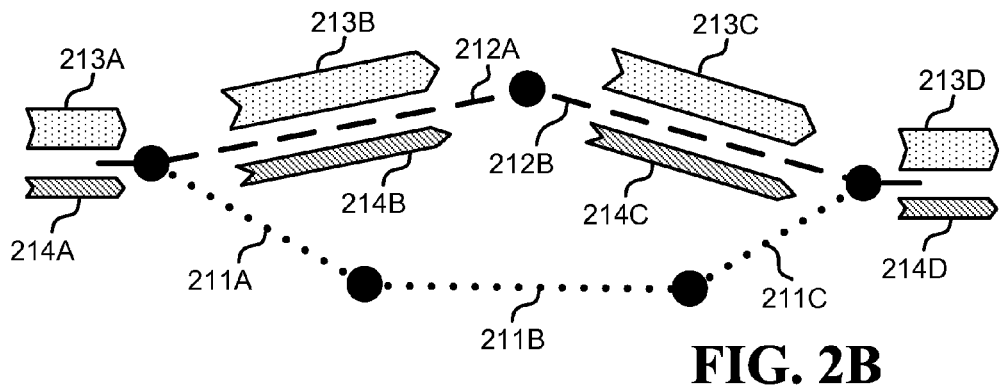
FIG. 2B illustrates one embodiment of a logical representation of the network illustrated in FIG. 2A.

FIG. 2B illustrates one embodiment of a logical representation of the physical data network of FIG. 2A, wherein the network is partitioned into a first L2 VC 212A, 212B and a second L2 VC 211A, 211B, 211C. Data packets may be mapped into two Classes of Service (CoS). Data 214A, 214B, 214C, 214D associated with a first CoS is transported via the first L2 VC 212A, 212B over the primary path, and data 213A, 213B, 213C, 213D associated with the second CoS is also transported via the first L2 VC 212A, 212B over the primary path.

In one embodiment, a rate supported by wireless link 205 is reduced at a certain point in time. The rate reduction may also be referred to as a reduction in performance of wireless link 205. In one embodiment, the reduction in performance may be caused by weather or radio interference, in accordance with some embodiments. In one embodiment, wireless link 205 is able to support data traffic associated with the first CoS but no longer able to support data traffic associated with both CoS simultaneously after being reduced in performance.

Figure 2C:
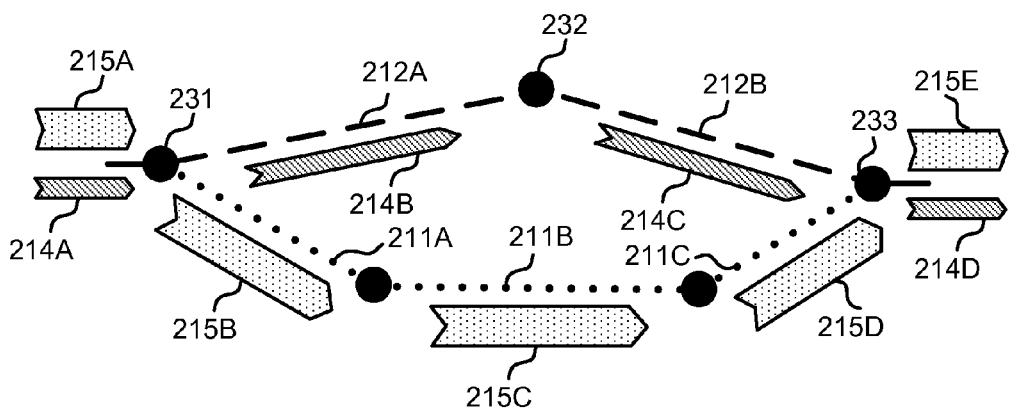
FIG. 2C illustrates one embodiment of a logical representation of the network illustrated in FIG. 2A, after a reduction in performance of a wireless link.

FIG. 2C illustrates one embodiment of a logical representation of the physical data network in FIG. 2A, after the reduction in performance of wireless link 205. The reduction in performance of wireless link 205 results in the first VC 212A, 212B no longer being able to support the data rate needed to transport the data associated with the first CoS and the data associated with the second CoS simultaneously. The reduction in performance of wireless link 205 is detected by one of the nodes 232, 233 and reported to the other nodes such as 231 and 233. It is noted that nodes 231, 232 and 233 are logical representation of physical nodes 201, 207 and 202 respectively. As a result of the report, node 231, which may be referred to as a first node, and node 233, which may be referred to as a second node, re-map the second CoS to the second L2 VC 211A, 211B, 211C. The data 214A, 214B, 214C, 214D associated with the first CoS continues to be transported through L2 VC 212A, 212B over the primary path. The data 214A, 214B, 214C, 214D associated with the second CoS is now transported through the second L2 VC 211A, 211B, 211C over the protection path.

In one embodiment, the first L2 VC 212A, 212B and the second L2 VC 211A, 211B, 211C are Ethernet L2 VC transporting Ethernet packets. In one embodiment, the first L2 VC 212A, 212B and the second L2 VC 211A, 211B, 211C are Virtual Local Area Networks (VLAN). In one embodiment, the report is done using Configuration Fault Management (CFM). In one embodiment, the report is done by sending an Alarm Indication Signal, associated with the second CoS, over L2 VC 212A, 212B, which is assigned to the primary path. In some embodiments, the report is done at the application level, or via a network control node, or via Network Management System (NMS); the NMS receiving indication of a reduction in the wireless link 205 either directly from node 202 or 207, or through another mechanism, and instructing node 201 to remap the second CoS to the second L2 VC 211A, 211B, 211C. In one embodiment Virtual Circuits may be organized with VLANs, with MPLS and virtual routing, or with MPLS and VPLS. In one embodiment, Virtual Circuits are organized by static configuration of FDB tables.

In one embodiment, a method for protection switching in radio networks, includes the following steps: Establishing a primary path for Layer-2 (L2) communication between a plurality of nodes, by linking the nodes in succession to each-other, forming a line topology network, while at least one of the links is a wireless link. Protecting the primary path, by establishing a protection path for L2 communication between one of the nodes located before the wireless link and one of the nodes located after the wireless link. Assigning a first L2 Virtual Circuit (VC) to the primary path and a second L2 VC to the protection path. Mapping, by the nodes, a first class of service (CoS) and a second CoS to the first L2 VC, and transporting packets of L2, associated with the two CoS, through the primary path. Detecting a performance reduction in the wireless link. Offloading packets associated with the second CoS from the wireless link, by re-mapping, by the one of the nodes located before the wireless link, the second CoS to the second L2 VC.

Figure 3A:
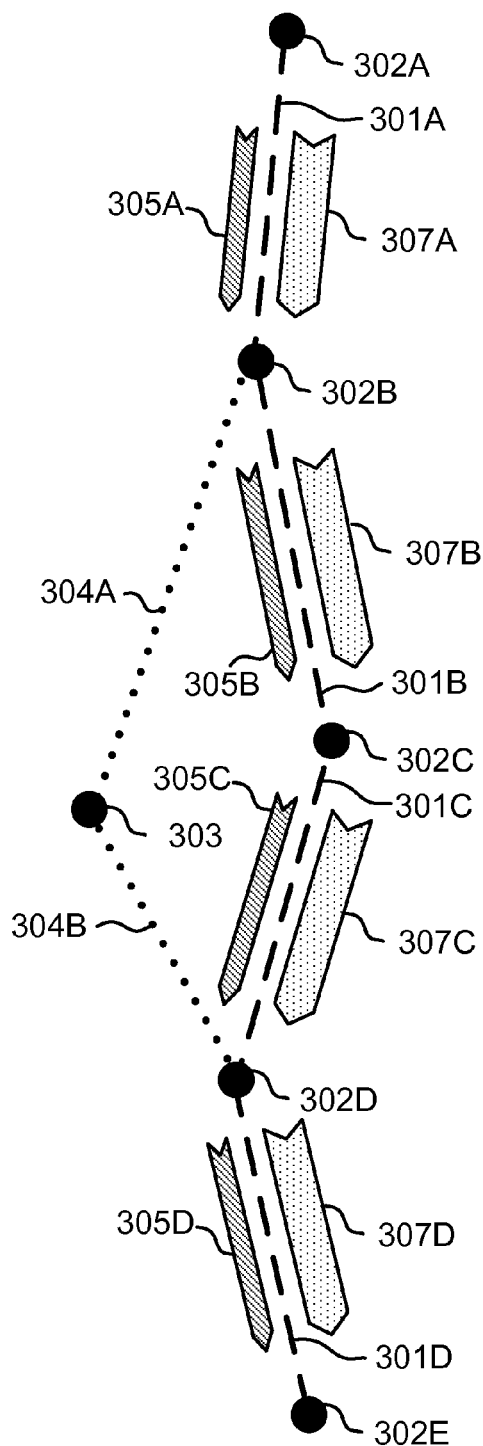
FIG. 3A illustrates one embodiment of a logical representation of a network including interconnected nodes.

FIG. 3A illustrates one embodiment of a logical representation of a network including interconnected nodes 302A, 302B, 302C, 302D, 302E, 303. Nodes 302C and 302D are wirelessly connected. Other nodes may be either wirelessly or wired connected. A primary path is established between node 302A and 302E 301A, 301B, 301C, 301D, 301E. The primary path is assigned a first L2 VC 301A, 301B, 301C, 301D. A protection path between node 302B and 302D goes through node 303. The protection path may be referred to as a detour or bypass path to node 302C. The protection path is assigned a second L2 VC 304A, 304B. In some embodiments, part of the protection path includes one or more wireless links. In some embodiments, the entire protection path consists of nodes connected by wireless links. In some embodiments, part of the protection path includes one or more wired links. In some embodiments, the entire protection path consists of nodes connected by wired links.

Data packets transported through the network are assigned two Classes of Service (CoS). In one embodiment, a first CoS may be associated with high priority data while a second CoS may be associated with lower priority data. At first, a wireless link between nodes 302C and 302D is providing full or nearly full data capacity. As a result, both the first CoS and the second CoS are mapped to the first L2 VC 301A, 301B, 301C, 301D. Consequently, data 305A, 305B, 305C, 305D associated with the first CoS is transported through the first L2 VC 301A, 301B, 301C, 301D and data 307A, 307B, 307C, 307D associated with the second CoS is also transported through the first L2 VC 301A, 301B, 301C, 301D.

Figure 3B:
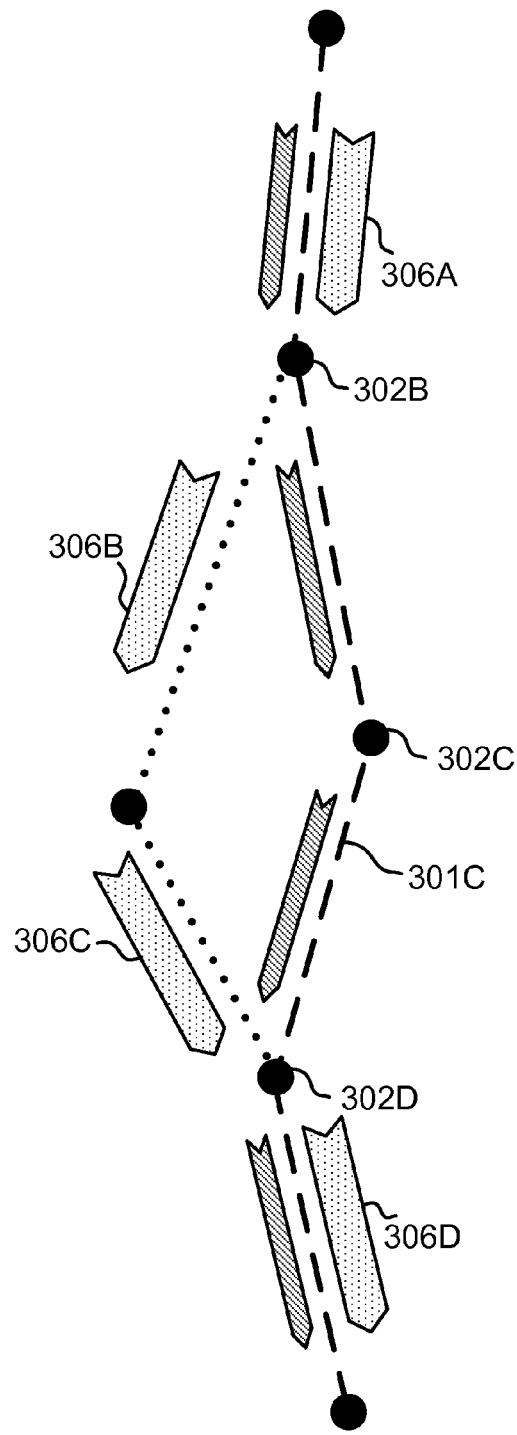
FIG. 3B illustrates one embodiment of a logical representation of a network including interconnected nodes, after a wireless link has been reduced in data capacity.

FIG. 3B illustrates one embodiment of the system from FIG. 3A with the difference being that the wireless link between nodes 302C and 302D has been reduced in data capacity. In some embodiments, the reduction in data capacity, which can also be referred to as a performance reduction in the wireless link, is due to weather or radio interference, in accordance with some embodiments. The performance reduction in the wireless link between nodes 302C and 302D may be detected by nodes 302C, 302D, or by node 302C, or by node 302D, or by other entity capable of monitoring the data capacity of the wireless link between nodes 302C and 302D. In one embodiment, nodes 302C or 302D detect the reduction in capacity and communicate it to at least some of the other nodes, such as nodes 302B. The second CoS is re-mapped to the second L2 VC 304A, 304B resulting in data 306A, 306B, 306C, 306D associated with the second CoS being transported over the second L2 VC 304A, 304B. In one embodiment, the re-mapping of the second CoS to the second L2 VC 304A, 304B occurs in node 302B. In one embodiment, the re-mapping of the second CoS to the second L2 VC 304A, 304B occurs in node 302D.

FIG. 4A illustrates one embodiment of a logical representation of a network including interconnected nodes 401A, 401B, 401C, 401D, 401E, 401F, 401G, 401H. In one embodiment, links connecting node 401A with node 401B, 401B with node 401C and 401C with node 401D are wireless links. Other links may be wired or wireless. A primary path is established between node 401A and 41E as illustrated by elements. The primary path is assigned a first L2 VC 402A, 402B, 402C, 402D. Protection paths are assigned individual L2 VCs. A protection path between nodes 401A and 402B is assigned a second L2 VC 403A, 403B, a protection path between nodes 401B and 401C is assigned a third L2 VC 404A, 404B, and a protection path between nodes 401C and 401D is assigned a fourth L2 VC 405A, 405B. Each L2 VC is assigned a VLAN ID. The first L2 VC 402A, 402B, 402C, 402D is assigned VLAN ID 001, the second L2 VC 403A, 403B is assigned VLAN ID 002, the third L2 VC 404A, 404B is assigned VLAN ID 004 and the fourth L2 VC 405A, 405B is assigned VLAN ID 005. Data packets transmitted through the network are assigned different CoS in accordance with some embodiments. At first, all wireless links in the primary path are working at full or near full data capacity and all CoS are mapped to the first L2 VC 402A, 402B, 402C, 402D. All data packets are transmitted through the first L2 VC 402A, 402B, 402C, 402D in accordance with some embodiments. Then, one of the wireless links in the primary path is reduced in capacity. As a result, one or more of the nodes 401A, 401B, 401C and 401D participating in the reduced capacity wireless link along the primary path are notified of the reduction in the wireless link. One of the nodes transmitting the data over the reduced capacity link re-maps at least some of the Classes of Service to alternate L2 Virtual Circuits. By way of example, a reduction in capacity of the wireless link between node 401A and 401B results in node 401A re-mapping at least one CoS to the second L2 VC 403A, 403B, a reduction in capacity of the wireless link between node 401B and 401C results in node 401B re-mapping at least one CoS to the third L2 VC 404A, 404B, and a reduction in capacity of the wireless link between node 401C and 401D results in node 401C re-mapping at least one CoS to the fourth VC 405A, 405B.

In one embodiment, data packets belong to either a first or second CoS. In one embodiment, data packets may belong to three or more CoS. In one embodiment a reduction of capacity in a wireless link results in re-mapping all but the first CoS to alternate L2 VC. In one embodiment, a reduction of capacity in a wireless link results in re-mapping only the last CoS to alternate L2 VC. In one embodiment, the node transmitting the data over the reduced capacity link remaps the first CoS to the first L2 VC and all other CoS to L2 VC associated with protection path in accordance with some embodiments. In one embodiment, the node participating in the wireless link uses an estimated data capacity of the wireless link to determine which Classes of Service to re-map to the L2 VC associated with protection path. In one embodiment, more than one wireless link suffers a reduction in data resulting in more than one node re-mapping classes of service in accordance with some embodiments.

FIG. 4B is the system of FIG. 4A with the difference being that two overlapping protection paths exist, the first protection path is associated with L2 VC 409A, 409B and the second protection path is associated with L2 VC 408A, 408B, 408C, 408D. In one embodiment, Node 401A receives information indicating that a wireless link between node 401A and 401B is suffering reduced capacity and the link between 401B and 401C is working at full capacity. As a result, node 401A re-maps some Classes of Service to the first protection path associated with L2 VC 409A, 409B, in accordance with some embodiments. In one embodiment, Node 401A receives information indicating that a wireless link between node 401B and 401C is suffering reduced capacity. As a result, node 401A re-maps some Classes of Service to the second protection path associated with L2 VC 408A, 408B, 408C, 408D in accordance with some embodiments. In one embodiment, a network control entity or NMS selects which L2 VC is used for the second CoS, by instructing the appropriate nodes to re-map the second CoS to the selected L2 VC. In one embodiment, the detection and communication of the reduction in wireless link data capacity is done at the application level, or via a network control node, or via Network Management System (NMS); the NMS may receive indication of a reduction in performance of a wireless link either directly from nodes associated with the wireless link, or through another mechanism, and instructing node 401A to remap the second Class of Service accordingly.

In one embodiment, spanning trees are used for protection switching in radio networks. A method for protection switching in radio networks, includes the following steps: Calculating one primary spanning tree and at least one protection spanning tree for an Ethernet network comprising a plurality of nodes interconnected by links carrying Layer-2 (L2) communication, the primary spanning tree comprising at least one wireless link interconnecting two of the nodes. Assigning a first Virtual Local Area Networks (VLAN) to the primary spanning tree, and a distinct VLAN to each of the protection spanning trees. Mapping, by the nodes, a first class of service (CoS) and a second CoS to the first VLAN, and transporting Ethernet packets associated with the two CoS, through the primary spanning tree. And upon detection of a reduction in performance of the wireless link, offloading packets from the wireless link, by re-mapping the second CoS to one of the VLANs assigned to one of the protection spanning trees not comprising the wireless link.

Figure 5A:
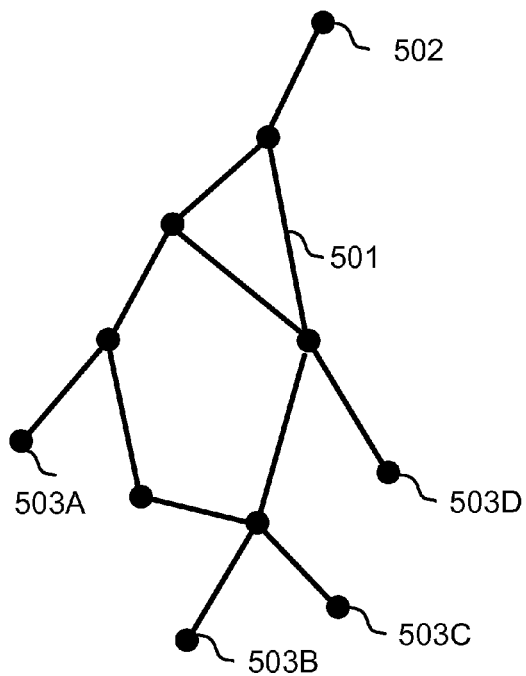
FIG. 5A Illustrates one embodiment of a network comprising nodes.
Figure 5B:
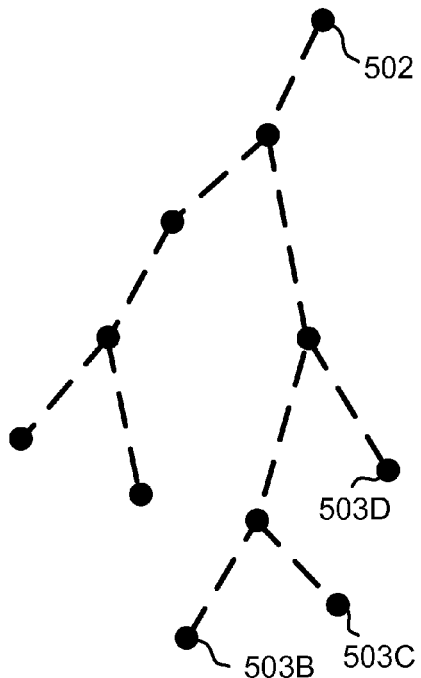
FIG. 5B illustrates one embodiment of a first spanning tree associated with the network illustrated in FIG. 5A.
Figure 5C:
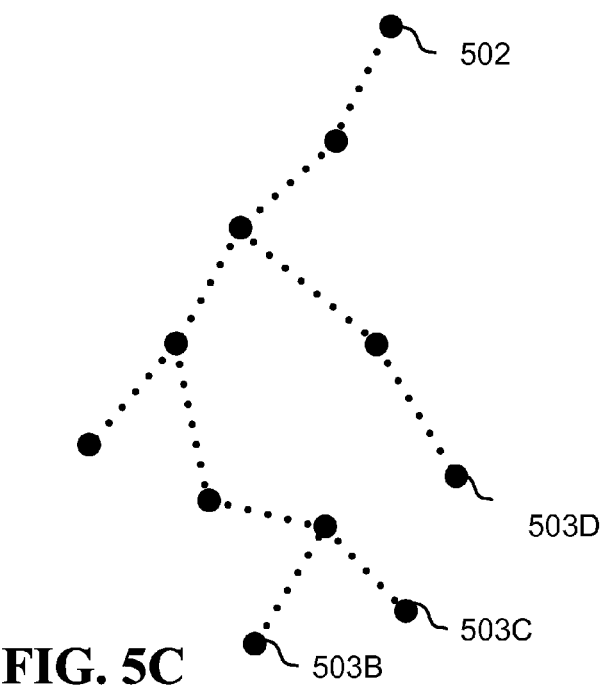
FIG. 5C illustrates one embodiment of a second spanning tree associated with the network illustrated in FIG. 5A.

FIG. 5A Illustrates one embodiment of a network including nodes 503A, 503B, 503C, 503D, 502, and other nodes, connected by links in accordance with some embodiments. In one embodiment, the network is configured in Tree Topology. In one embodiment the network is a backhaul network designed to connect nodes 503A, 503B, 503C, 503D to node 502. Link 501 is a wireless link. Other links may be wired or wireless. FIG. 5B illustrates one embodiment of a first spanning tree associated with the network illustrated in FIG. 5A. In accordance with this spanning tree, network data packets sent to or from nodes 503B, 503C, 503D are transported through wireless link 501. FIG. 5C illustrates one embodiment of a second spanning tree associated with the network illustrated in FIG. 5A. Wireless link 501 is not a part of this spanning tree. In one embodiment, each spanning tree is associated with a VLAN ID. By way of example, the first spanning tree is associated with VLAN ID 001 and the second spanning tree is associated with VLAN ID 002. Data packets are associated with different CoS in accordance with some embodiments. All CoS are mapped into VLAN ID 001. In accordance with some embodiments, when a reduction in data capacity is detected in wireless link 501, one or more of the CoS are mapped to VLAN ID 002. As a result, some of the data packets traveling to nodes 503B, 503C, 503D are offloaded from wireless link 501.

In one embodiment, a system for protection switching in radio networks includes a plurality of nodes, a plurality of links of Ethernet interconnecting the nodes and forming a network, at least one wireless link interconnecting two of the nodes, and two Virtual Local Area Networks (VLAN) within the network, only the first VLAN comprising the wireless link. The network transport packets of Ethernet associated with a first Class of Service (CoS) and a second CoS via the first VLAN. Upon detection of a reduction in performance of the wireless link, the network maps the second CoS to the second VLAN, and by that offloads traffic associated with the second CoS from the wireless link. In one embodiment, the first CoS has a higher priority as compared to the second CoS, the reduction in performance still allows packets associated with the first CoS to be transported via the primary path, and as a result of the mapping of the second CoS to the second VLAN, the wireless link is cleared from packets associated with the second CoS. In one embodiment, at least one of the two nodes connected by the wireless link performs the detection, and reports the detection to nodes of the network using standard Connectivity Fault Management (CFM) signaling, such as an Alarm Indication Signal. In one embodiment, the Alarm Indication Signal is associated with the second CoS, and is sent over the first VLAN. In one embodiment, a node associated with the wireless link reports the detection to a network management entity, and the network management entity reports the detection to nodes of the network.

Figure 6A:
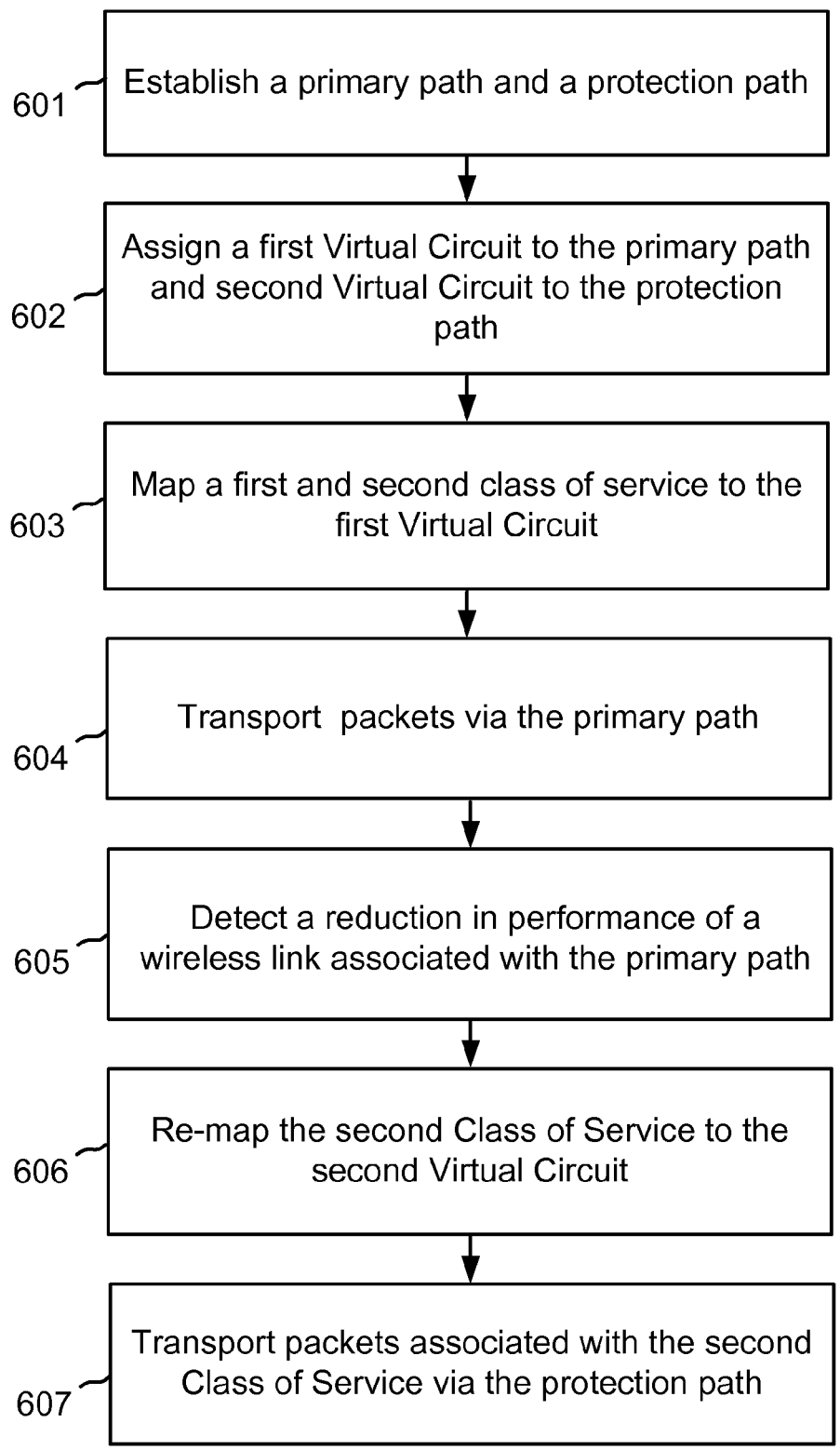
FIG. 6A illustrates a flow diagram describing one method for protection switching in radio networks.

FIG. 6A illustrates a flow diagram describing one method for protection switching in radio networks, comprising the following steps: In step 601, establishing a primary path and a protection path between a first node and a second node, the primary path comprising two links connected in succession by a relay node, and at least one of the links is a wireless link. In step 602, assigning a first VC to the primary path, and a second VC to the protection path, the first and second VC may be L2 VC. In step 603, mapping, by the first node, a first CoS and a second CoS to the first VC. In step 604, transporting packets associated with the two CoS, from the first node to the second node, via the primary path. In step 605, detecting, by a node associated with the wireless link, a reduction in performance of the wireless link. In step 606, re-mapping the second CoS to the second L2 VC, by the first node. In optional step 607, transporting packets associated with the second CoS to the second node via the protection path.

Figure 6B:
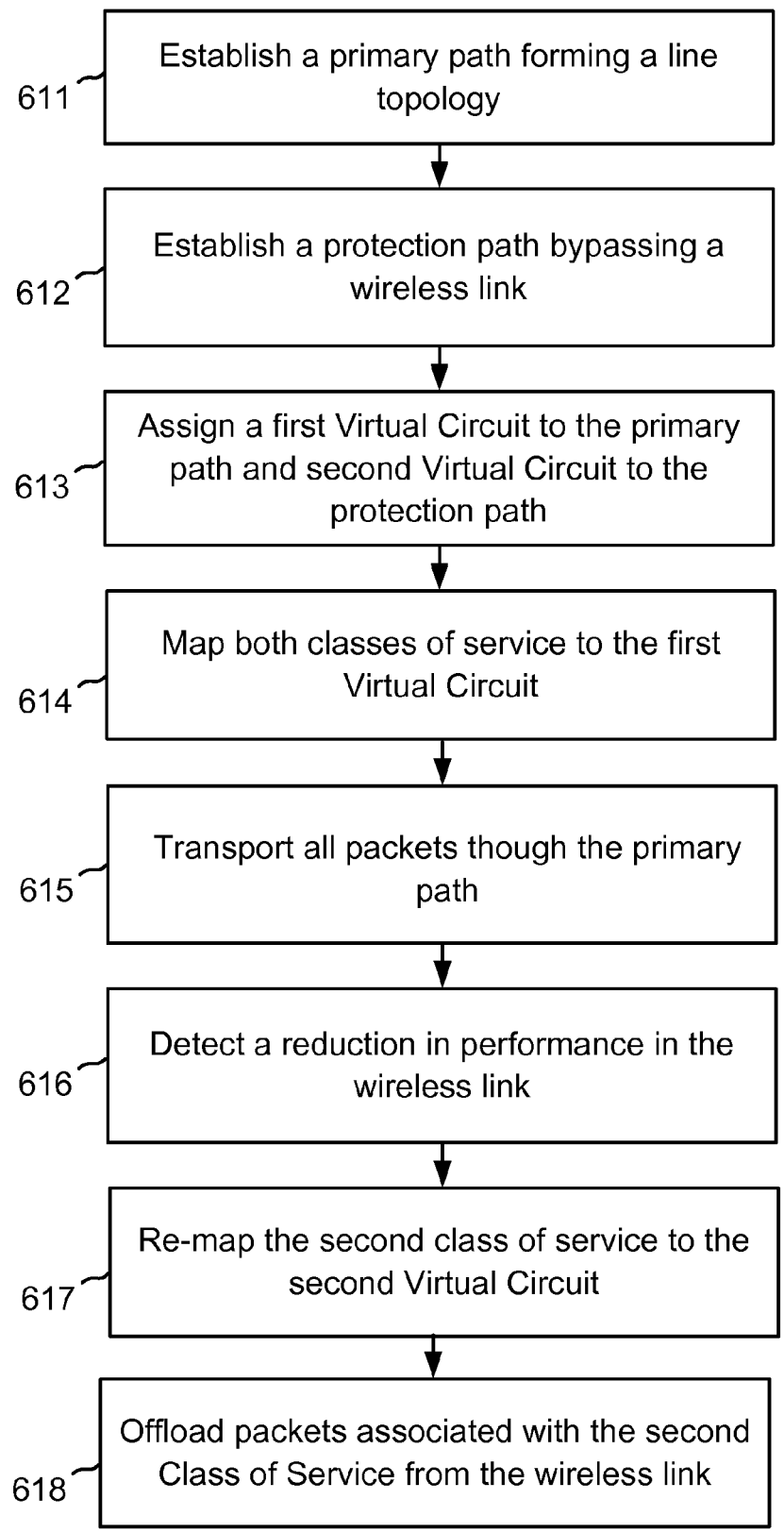
FIG. 6B illustrates a flow diagram describing one method for protection switching in radio networks.

FIG. 6B illustrates a flow diagram describing one method for protection switching in radio networks, comprising the following steps: In step 611, establishing a primary path between a plurality of nodes, by linking the nodes in succession to each-other, forming a line topology network, while at least one of the links is a wireless link. In step 612, protecting the primary path, by establishing a protection path between one of the nodes located before the wireless link and one of the nodes located after the wireless link. In step 613, assigning a first VC to the primary path and a second VC to the protection path, the first and second VC may be L2 VC. In step 614, mapping, by the nodes, a first class of service (CoS) and a second CoS to the first VC. In step 615, transporting L2 packets, associated with the two CoS, through the primary path. In step 616, detecting a performance reduction in the wireless link. In step 617, re-mapping, by the one of the nodes located before the wireless link, the second CoS to the second VC. In step 618, offloading packets associated with the second CoS from the wireless link, by re-mapping, by the one of the nodes located before the wireless link, the second CoS to the second VC.

Figure 6C:
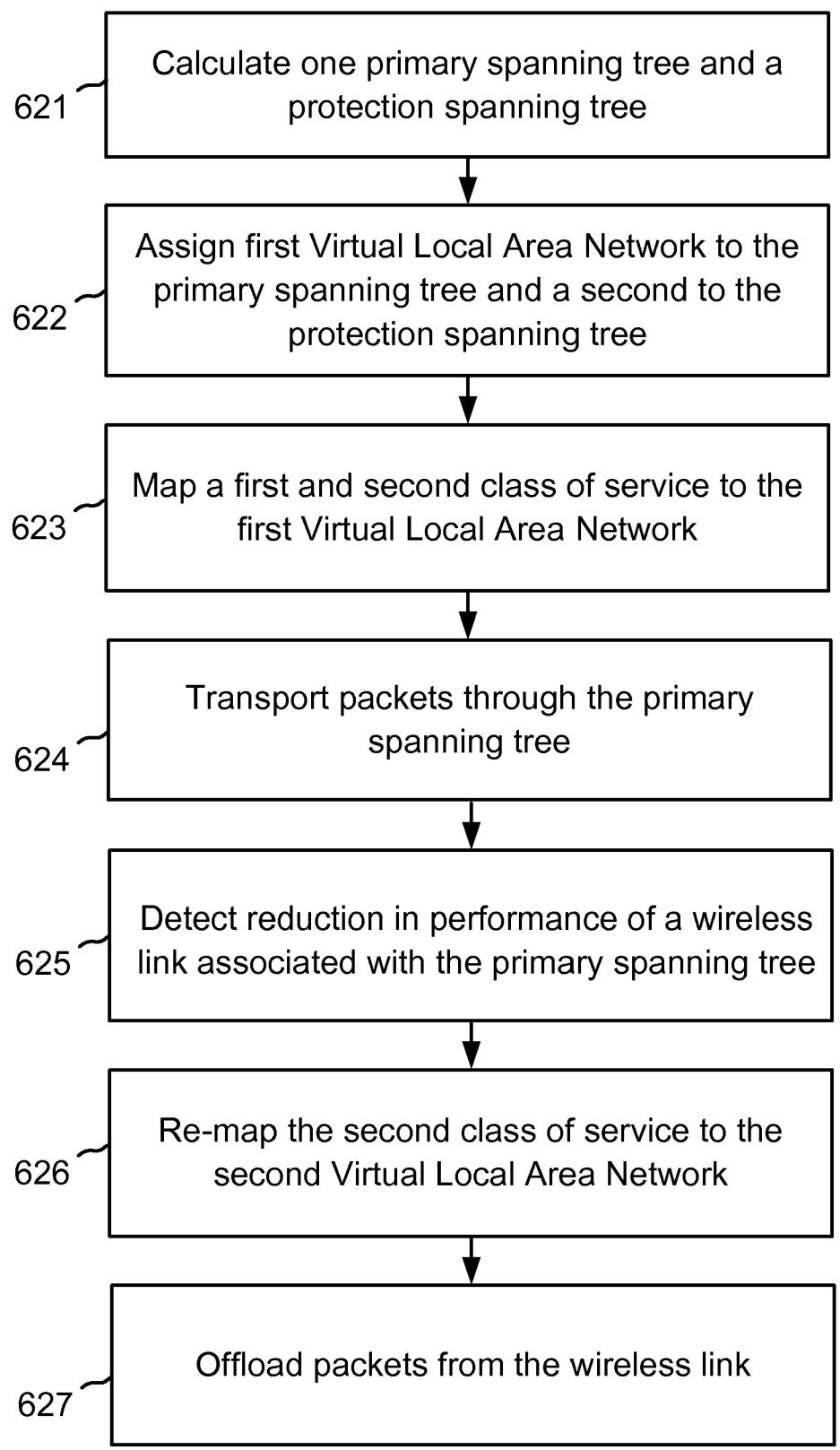
FIG. 6C illustrates a flow diagram describing one method for protection switching in radio networks.

FIG. 6C illustrates a flow diagram describing one method for protection switching in radio networks, comprising the following steps: In step 621, calculating one primary spanning tree and at least one protection spanning tree for a network comprising a plurality of nodes interconnected by links, the primary spanning tree comprising at least one wireless link. In step 622, assigning a first Virtual Local Area Networks (VLAN) to the primary spanning tree, and a second VLAN to the at least one protection spanning tree. In step 623, mapping, by the nodes, a first class of service (CoS) and a second CoS to the first VLAN. In step 624, transporting packets associated with the two CoS, through the primary spanning tree. In step 625, detecting a reduction in performance of the wireless link. In step 626, re-mapping the second CoS to one of the protection VLAN not comprising the link. In step 627, offloading packets from the wireless link.

In one embodiment, a method for adapting to changing wireless transmission rates includes the following steps: Ascertaining, from time to time, the rate at which packets are wirelessly sent by a packet radio system. Indicating dynamically, according to the rate, to a network enabled system, by the packet radio system, classes of packets for which packets are to be sent from the network enabled system to the packet radio system over a packet transport channel. Sending, by the network enabled system, to the packet radio system, over the packet transport channel, packets of classes of packets indicated by the packet interface, while holding back other packets.

Figure 7:
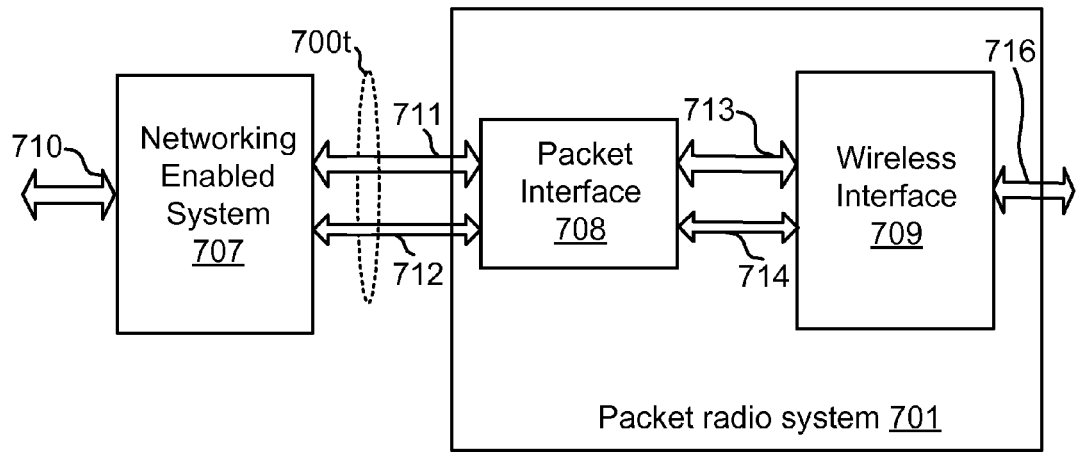
FIG. 7 illustrates one embodiment of a packet radio system operative to relay packets from a networking enabled system towards a recipient node.

FIG. 7 illustrates one embodiment of a packet radio system 701 operative to relay packets from a networking enabled system 707 towards a recipient node (not illustrated), via a wireless link 716. The networking enabled system 707 may be a Layer-2 (L2) switch, a router, another relay, or any other entity capable of processing and transporting L2 packets towards the packet radio system 701. The packet radio system 701 may be a backhaul node, a relay, or any other entity capable of receiving L2 packet traffic from the networking enabled system 707, and transmitting the traffic via a wireless interface 709 to the recipient node. The recipient node may be a Base Station, a network node, or any entity capable of receiving L2 traffic via wireless link 716. Packets may be transported from the networking enabled system 707 towards the recipient node, and vice versa. The networking enabled system 707 may connected to the packet radio system 701 via a packet transport channel 700t. The packet transport channel 700t may be carried by a cable (not illustrated) connecting the networking enabled system 707 with the packet radio system 701. Two types of data may be transported over packet transport channel 700t: (i) payload data, carried over logical link 711, carries packets of different classes of packets to be relayed or switched by the packet radio system 701, and (ii) control data, carried over logical link 712, sent by the packet radio system 701 to manage or control various aspects of the networking enabled system 707. In one embodiment, the cable is a standard Ethernet cable, and the packet transport channel 700t is a standard Ethernet connection. In one embodiment, only the payload data is transported over the packet transport channel 700t, while the control data is transported by other means, such as another data link carried over a different cable. In one embodiment, the networking enabled system 707 is physically separate from the packet radio system 701, and may be distant from the packet radio system 701.

In one embodiment, the wireless link 716 is subject to various conditions affecting the rate at which data can be transported over wireless interface 709, in accordance with some embodiments. The packet radio system 701 adapts to the rate at which packets are wirelessly sent by (i) ascertaining, from time to time, the rate at which packets are wirelessly sent by the packet radio system 701, and (ii) according to the rate, indicating to the network enabled system, via logical link 712, the classes of packets for which packets are to be sent over the packet transport channel 700t via logical link 711. The network enabled system 707 sends packets of classes of packets indicated by the packet interface 708 of the packet radio system 701, while holding other packets back. According to one non limiting example, two classes of packets are to be transported from the networking enabled system 707 to the packet radio system 701, and from there to a recipient node via the wireless interface 709. The first class of packets contains high priority Voice over Internet Protocol (VoIP) packets, and the second class of packets contains lower priority general HTTP packet traffic. By way of example, at first, both classes of packets arrive at the networking enabled system 707 via link 710 at a combined rate of 800 Mbps, out of which 100 Mbps is utilized by the VoIP traffic. Assuming that the wireless interface 709 currently supports 1 Gbps, and that the packet transport channel 700t is a 1 Gbps Ethernet connection, it is possible to transport all packet traffic without distinction. Then, the wireless link 716, which may be a millimeter-wave point-to-point link, suffers a degradation in performance, possibly due to rain or other atmospheric conditions. By way of example, the wireless link 716 drops from 1 Gbps to 250 Mbps. At this state, the wireless link 716 may no longer transport both classes of packets, and the ratio packet system 701 indicates to the networking enabled system 707 that only the first class of packets may be sent over the packet transport channel 700t. As a result, packets belonging to the second class are held back by the networking enabled system 707 and are not transported to the packet radio system 701, while packets belonging to the first class are still delivered to the packet radio system 701. This result is maintained until the indication changes. When the wireless link 716 is restored to full data capacity, the indication changes to allow transport of both classes of packets. In one embodiment, the packet transport channel 700t is a standard Ethernet connection comprising a cable operative to transport Ethernet signaling between the network enabled system 707 and the packet radio system 701. In one embodiment, a first class of packets has a transmission priority higher than a second class of packets, and the network enabled system 707 is indicated to send packets of the first and second classes of packets when the rate at which data can be transported over wireless interface 709 is above a threshold, and to send only packets of the first class of packets when the rate is below the threshold. In one embodiment, a first class of packets and a second class of packets are associated with a first rate and a second rate respectively, the first and second rates together substantially equal to the rate at which packets are wirelessly sent by the packet radio system 701, or together lower than the rate at which packets are wirelessly sent by the packet radio system. The network enabled 707 system sends packets of the first class of packets at substantially the first rate, and sends packets of the second class of packets at substantially the second rate, in response to dynamic changes in the indications send by the packet radio system 701.

In one embodiment, a first class of packets is associated with a first rate, and the second class of packets is associated with a second rate. The two rates together substantially equal to the rate at which packets are wirelessly sent by the packet radio system 701, or together lower than the rate at which packets are wirelessly sent by the packet radio system. The network enabled system 707 is made to send packets of the first class at substantially the first rate, and send packets of the second class at substantially the second rate, by dynamically changing the indications to the network enabled system 707 regarding the classes of packets for which packets are to be sent over the packet transport channel 700t. Controlling the transport rates of different classes of packets by dynamically changing the indications may be achieved in various ways, including: (i) toggling the indication associated with a certain class of packets between the two states of "Clear_to_Send" and "Hold-Back" at a duty cycle estimated to substantially result in a desired packet transport rate, or (ii) indicate the networking enabled system 707 to stop sending packets associated with a certain class when the measured average transport rate of the class exceeds a certain value. It is noted that any arbitrary rate can be assigned to the different classes of packets, as long as the aggregated rate of all of the transported classes does not exceed the data capacity of wireless link 716. It is noted that the aggregated rate may be set to reach only a portion of the data capacity of wireless link 716. According to one example, the portion is 80%.

In one embodiment, the allocation of transport rates to the different classes of packets may be a function of the data capacity of wireless link 716. According to one example, when the data capacity or rate of wireless link 716 (R) is at a certain high range, a first class of packs is allocated 40% of R, a second class of packets is allocated 30% of R, and a third class of packets is allocated 30% of R. When the data capacity drops to below a certain threshold, the first class of packs, which may be associated with high priority, is allocated 80% of R, the second class of packets is allocated 15% of R, and a third class of packets is allocated 5% of R.

In one embodiment, a system includes a networking enabled system and a packet radio system. The packet radio system includes a wireless interface and a packet interface. The packet interface includes at least two queues, each queue configured to store a certain class of packets of Ethernet. A cable is operative to transport the packets from the networking enabled system to the packet interface using Ethernet signaling. The packet interface is configured to ascertain from time to time the rate at which the packets are sent from the queues over the wireless interface, and according to the rate, indicate dynamically to the network enabled system the classes of packets for which packets are to be sent over the cable for storage in the appropriate queues. The network enabled system is configured to send, over the cable, packets of classes indicated by the packet interface, while holding back other packets.

Figure 8:
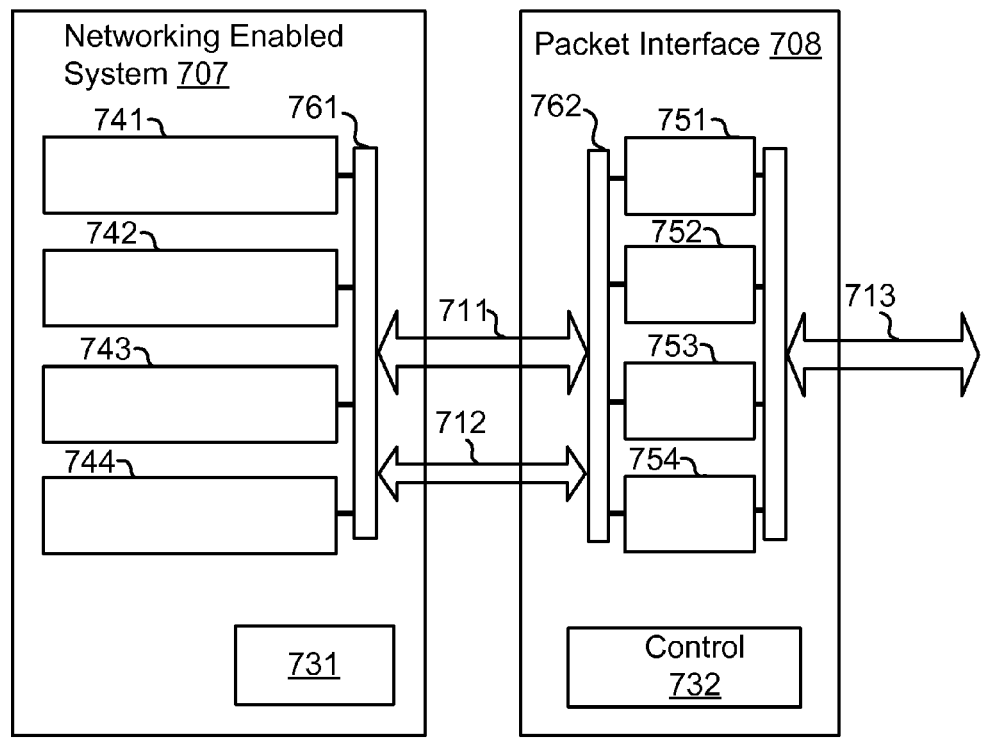
FIG. 8 illustrates one embodiment of a packet interface connected to a network enabled system.

FIG. 8 illustrates one embodiment of a packet interface 708 connected to a network enabled system 707 via logical link 711 and a logical link 712. Packets are transported over logical links 711, 712. The logical links 711, 712 may be carried by an Ethernet cable (not illustrated), driven by two Ethernet communication interfaces 761, 762. The packet interface 708 is a component within the packet radio system 701, and includes at least two Ethernet packet queues 751, 752, 753, 754, illustrated as four Ethernet packet queues by way of example. Each Ethernet packet queue 751, 752, 753, 754 stores a certain class of packets. The packet interface 708 ascertains the rate at which packets are sent from the queues 751, 752, 753, 754 via a data interface 713 to the wireless interface 709 for transmission over the wireless link 716. According to the rate ascertained, the packet interface 708 dynamically indicates to the network enabled system 707, via logical link 712, the classes of packets for which packets are to be sent over the cable for storage in the appropriate queues 751, 752, 753, 754. The network enabled system 707 sends, over logical link 711, packets of classes indicated by the packet interface, while holding back other packets. In one embodiment, each queue 751, 752, 753, 754 in the packet interface 708 is associated with a queue 741, 742, 743, 744 in the networking enabled system 707, and each associated pair of queues, such as queues 741, 751, may store a certain class of packets that may be associated with a certain transmission priority level. Queues 741, 742, 743, 744 may be paired with queues 751, 752, 753, 754 respectively. In one embodiment, control component 732 sends a clear-to-send indication, per a class of packets, to a controlled component 731, which in turn controls or instructs queues 741, 742, 743, 744, associated with the indicated classes of packets, to either send packets via the logical link 711, or hold back transmission according to the indications.

Figure 9:
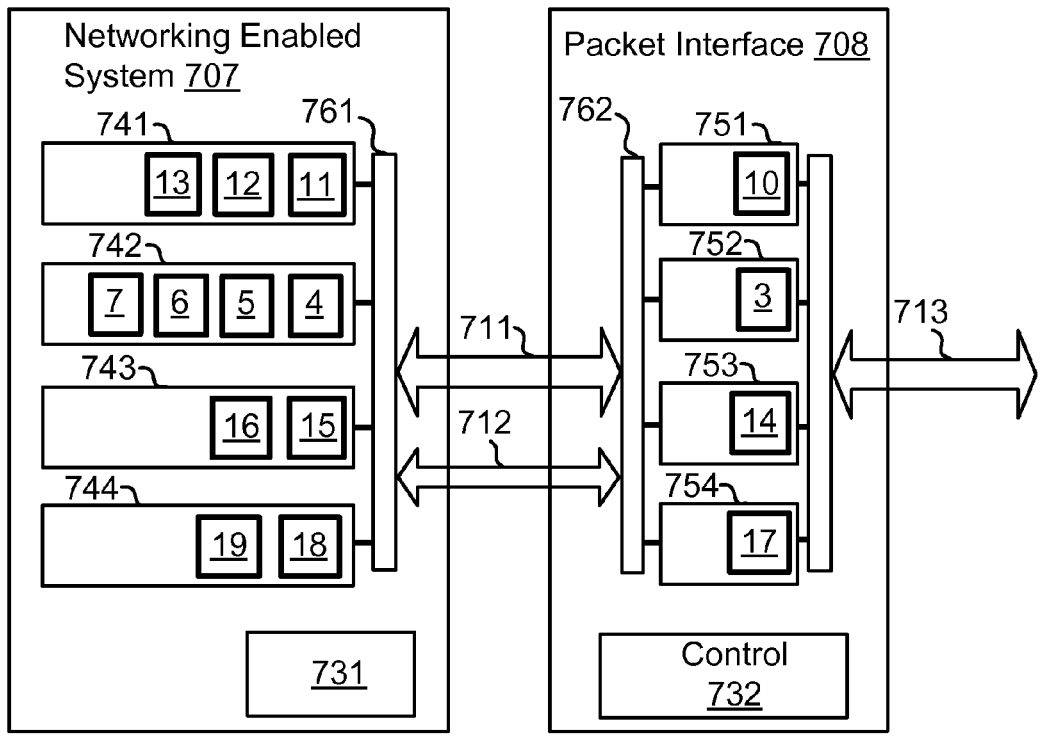
FIG. 9 illustrates one embodiment of a packet interface connected to a network enabled system.
Figure 10:
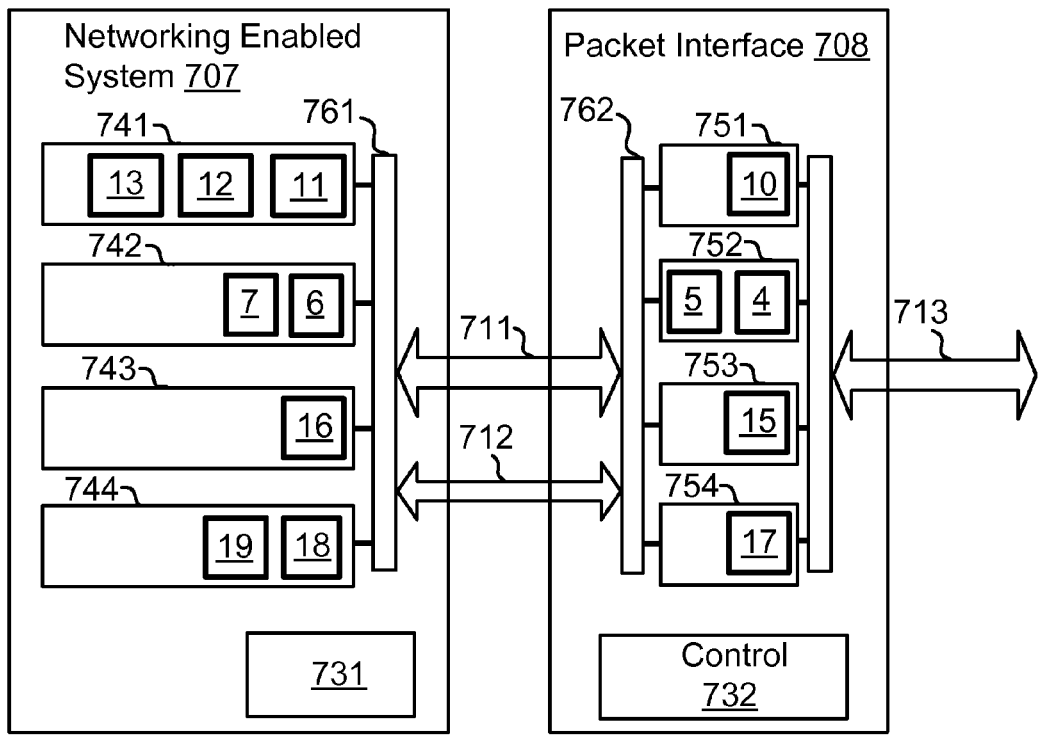
FIG. 10 illustrates one embodiment of a packet interface connected to a network enabled system.

FIG. 9 and FIG. 10 illustrate one embodiment of exemplify operation. Packets 10, 11, 12, 13 belong to a first class of packets associated with queues 751 and 741, packets 3, 4, 5, 6, 7 belong to a second class of packets associated with queues 752 and 742, packets 14, 15, 16 belong to a third class of packets associated with queues 753 and 743, and packets 17, 18, 19 belong to a fourth class of packets associated with queues 754 and 744. In FIG. 9, only packets 10, 3, 14, and 17 are already stored in the queues 751, 752, 753, 754 of the packet interface 708. The rest of the packets are still stored in the queues 741, 742, 743, 744 of the networking enabled system 707. At this point in time, the data capacity of the wireless link 716 drops to a level that does not permit sending packets belonging to all four classes of packets, at least not momentarily. As a result, the packet interface 708 indicates to the networking enabled system 707, via logical link 712, to stop sending via logical link 711 packets associated with the first and fourth classes of packets. Consequently, in FIG. 10, only queues 752 and 753 receive new packets 4, 5, 15 from the networking enabled system 707. It is noted that packets 3 and 14 were taken from queues 752 and 753, by the wireless interface 709, via data interface 713, for transmission over the wireless link 716. During this process, queues 741 and 744, storing packets of the first and fourth classes of packets, do not send new packets to the packet interface 708 of the packet radio system 701.

Figure 11A:
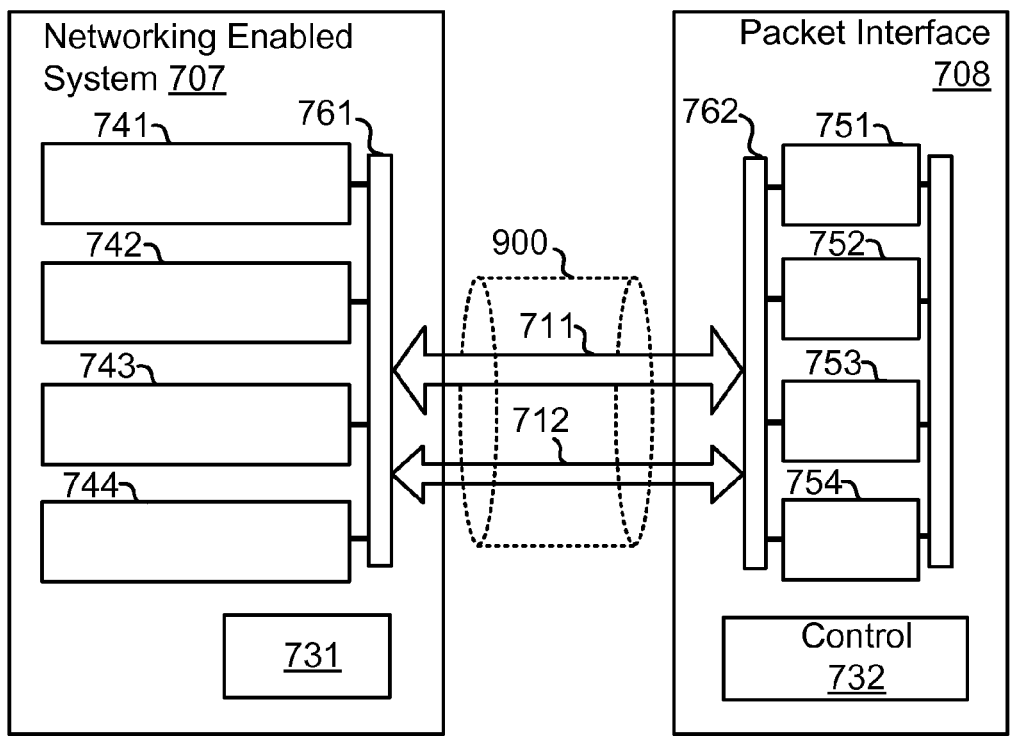
FIG. 11A illustrates one embodiment of a packet interface connected to a network enabled system, in which logical links are carried over a cable.

FIG. 11A illustrates one embodiment of the system, in which both logical link 712 and logical link 711 are carried over a cable 900 which may be an Ethernet cable. In this case, only one cable, the cable 900, is needed to connect the networking enabled system 707 with the packet radio system 701. The indications are sent by control element 732, via logical link 712 and over cable 900, to controlled element 731, which in turn controls or instructs queues 741, 742, 743, 744, associated with the indicated classes of packets, to either send packets via the packet transport interface 900t, or hold back transmission according to the indications.

Figure 11B:
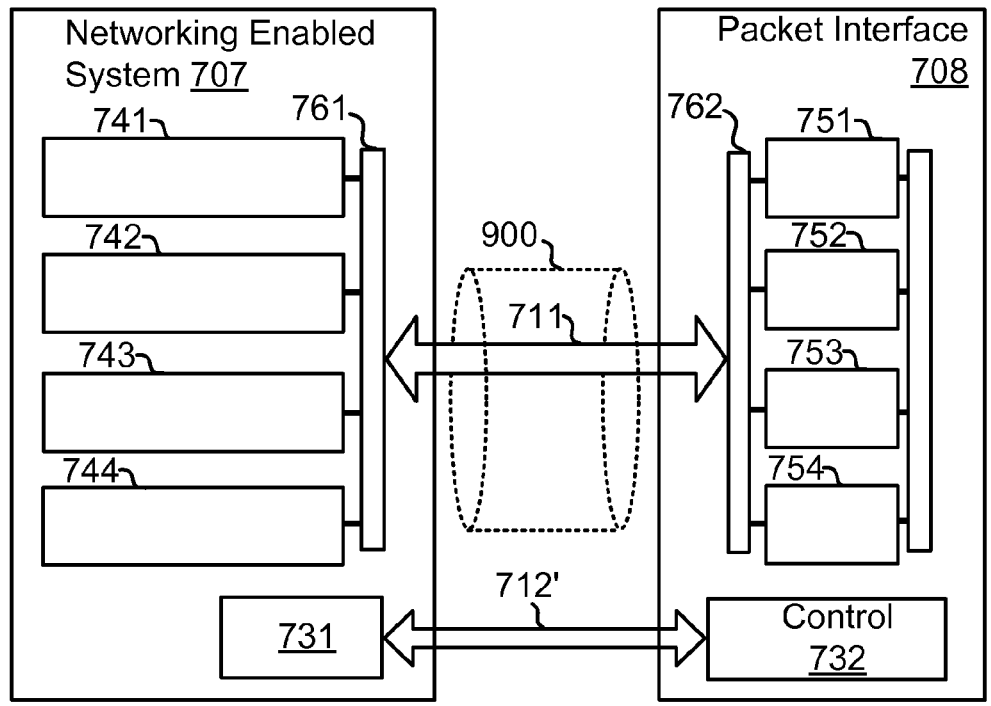
FIG. 11B illustrates one embodiment of a packet interface connected to a network enabled system, in which some logical links are carried over a cable.

FIG. 11B illustrates one embodiment of the system, in which only logical link 711 is carried over cable 900. In this case, another communication interface is needed to facilitate logical link 712. The indications are therefore sent by control element 732 to controlled element 731 via logical link 712', which is a logical link similar in function to logical link 712 with the exception that it is not carried by cable 900 using Ethernet communication interfaces 761, 762. Controlled element 731 receives the indications via logical link 712', and in turn, instructs queues 741, 742, 743, 744, associated with the indications, to either send packets via the packet transport interface 900t, or hold back transmission according to the indications.

In one embodiment, a first class of packets has a transmission priority higher than a second class of packets. The packet interface 708 indicates the network enabled system 707 to send packets of the first and second classes when the rate is above a certain threshold, and to send only packets of the first class when the rate is below the threshold. In one embodiment, a first class of packets has a transmission priority higher than a second class of packets. The packet interface 708 allocates a first probability for sending packets of the first class of packets, and a second probability for sending packets of the second class of packets, the first probability is higher than the second probability. The packet interface 708 then randomly or pseudo-randomly changes the indications from time to time according to the probabilities, resulting in a reduction of traffic rate for the second class of packets, as compared to the first class of packets. In one embodiment, a first class of packets has a transmission priority higher than a second class of packets. The packet interface 708 allocates a first rate and a second rate. The first and second rates together are substantially equal, or smaller than, the rate at which packets are wirelessly sent by the packet radio system 701. The packet interface 708 causes the network enabled system 707 to send packets of the first class of packets at substantially the first rate, and send packets of the second class of packets at substantially the second rate, by indicating to the network enabled system 707 that packets of the first class of packets are to be sent at substantially the first rate, and that packets of the second class of packets are to be sent at substantially the second rate. The network enabled system 707 then sends packets of the different classes of packets according to the indicated rates. In one embodiment, the indications are sent over an out-of-band interface, not comprising the cable. In one embodiment, the rate or data capacity of the wireless link 716 is ascertained by measuring, by the packet interface 708, the rate at which packets are sent over data interface 713, to the wireless interface 709. In one embodiment, the rate or data capacity of the wireless link 716 is ascertained by receiving a rate indication from the wireless interface 709.

In one embodiment, a system includes a networking enabled system 707 and a packet radio system 701. The packet radio system 701 includes a wireless interface 709 and a packet interface 708. The packet interface 708 includes at least two queues 751, 752, 753, 754, each queue 751, 752, 753, 754 configured to store a certain class of packets of Ethernet. A cable 900 transports the packets from the networking enabled system 707 to the packet interface 708 using Ethernet signaling. The packet interface 708 sends packets from the queues 751, 752, 753, 754 over the wireless interface 709, at a rate corresponding to a wireless transmission rate currently supported by the wireless interface 709, and according to priorities associated with the class of packets stored on each queue. The packet interface indicate dynamically to the network enabled system the classes of packets for which packets are to be sent over the cable for storage in the appropriate queues, according to the status of the queues. Optionally, the network enabled system sends, over the cable, packets of classes of packets indicated by the packet interface, while holding back other packets. In one embodiment, the status of the queues is the unutilized storage remaining in each of the queues. In one embodiment, the status of the queues is the number of queue overflow events.

Figure 12:
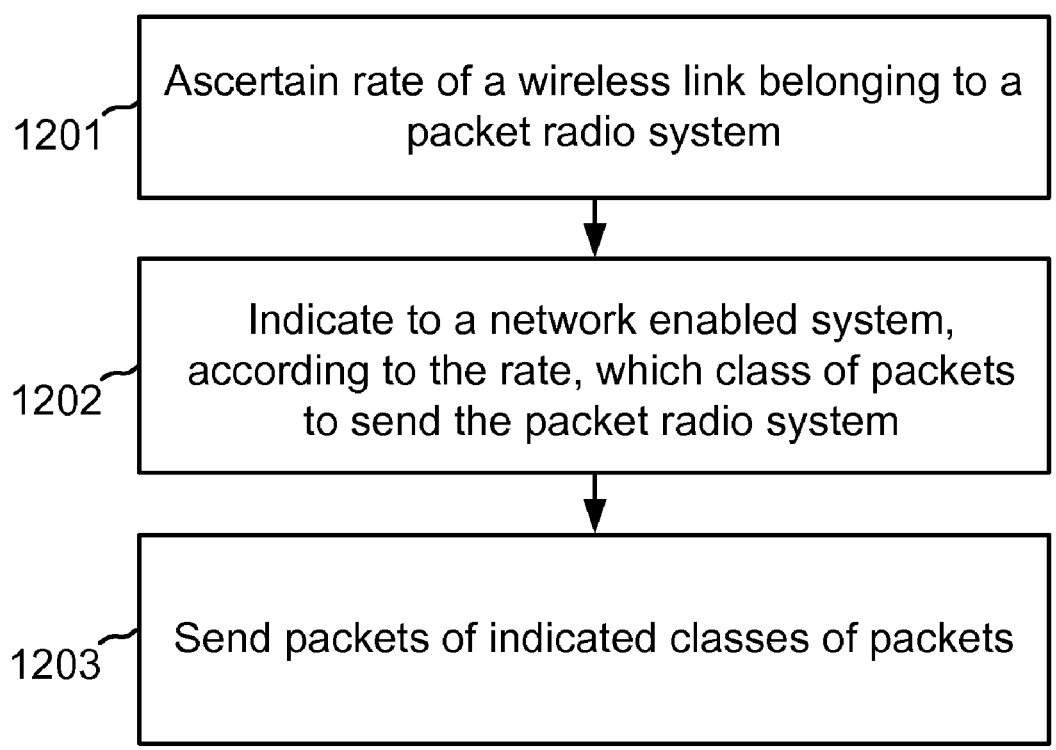
FIG. 12 illustrates a flow diagram describing one method for interfacing between a network enabled system and a packet radio system.

FIG. 12 illustrates a flow diagram describing one method for interfacing between a network enabled system and a packet radio system, comprising the following steps: In step 1201, ascertaining, from time to time, the rate at which packets are wirelessly sent by a packet radio system. In step 1202, dynamically indicating, according to the rate, to a network enabled system, by the packet radio system, classes of packets for which packets are to be sent from the network enabled system to the packet radio system over a packet transport channel. In step 1203, Sending, by the network enabled system, to the packet radio system, over the packet transport channel, packets of classes indicated by the packet interface, while holding back other packets.

Some important cellular features depend on backhaul capacity available to the Radio Access Network (RAN). One example is soft handover in networks such as LTE or WiMAX. The 3GPP LTE standard does not include soft handover, nevertheless, soft handover is still likely to be implemented as a proprietary feature. In WiMAX, soft handover is part of the standard. Hence, it is likely that other 4G cellular architectures will also provide for the possibility of soft handover. Executing soft handover in a 4G network is possible only if there is enough backhaul capacity between the neighbor base stations involved in the process of soft handing over a mobile terminal. If needed backhaul capacity is not available, it is better not to invoke the feature. Low backhaul communication latency between the involved nodes is another condition for successful soft handover. Another example for a feature depending on backhaul capacity available to the RAN is macro-diversity, in which the same information is wirelessly transmitted to a mobile station from two or more base stations concurrently. The information to be transmitted may be forwarded from one base station to the other base stations over a backhaul link. Yet another example is soft combining of signals received by two or more base stations, requiring at least one of the base station to share signal information with another base station.

In one embodiment, a method for communicating between Radio Access nodes includes the following steps: Identifying at least some paths belonging to a backhaul system of a Radio Access Network (RAN), each path interconnecting a pair of Radio Access nodes belonging to the RAN. Ascertaining, from time to time, per path, at least one type of Traffic Engineering (TE) metric associated with communicating real-time data between a pair of Radio Access nodes interconnected by the path. Conveying, per path, the ascertained TE metric, to the pair of Radio Access nodes interconnected by the path. And upon requirement, of one of the Radio Access nodes of a pair, to invoke an operation associated with communicating real-time data between the Radio Access nodes of the pair, deciding, by the Radio Access node of the pair that made the requirement, to invoke the operation, provided that the TE metric, conveyed to the Radio Access node of the pair that made the requirement, and associated with a path interconnecting the pair of Radio Access nodes, indicates that such real-time data communication is viable over the path.

In some embodiments, a soft handover, a macro-diversity transmission, a soft signal combining, or any other operation requiring communicating real-time data between Radio Access nodes of a RAN, is performed by Radio Access nodes only after a backhaul system interconnecting the Radio Access nodes indicates to the Radio Access nodes that a path of the backhaul system interconnecting the Radio Access nodes has sufficient data capacity and/or sufficiently low latency required to support the operation. This is done by first identifying at least some paths of the backhaul system, each path interconnecting a pair of Radio Access nodes belonging to the RAN, and operative to transport data between the pair of the Radio Access nodes. Then, ascertaining, from time to time, per path identified, at least one type of Traffic Engineering (TE) metric associated with transporting data between a pair of Radio Access nodes interconnected by the path. Then, conveying, per path, the ascertained TE metric, to the pair of Radio Access nodes interconnected by the path. And upon requirement, of one of the Radio Access nodes of a pair, to invoke an operation associated with communicating real-time data between the Radio Access nodes of the pair, deciding, by the requiring Radio Access node of the pair, to invoke the operation, provided that the TE metric conveyed to the requiring Radio Access node and associated with a path interconnecting the pair of nodes, indicates that such real-time data communication is viable over the path.

Figure 13A:
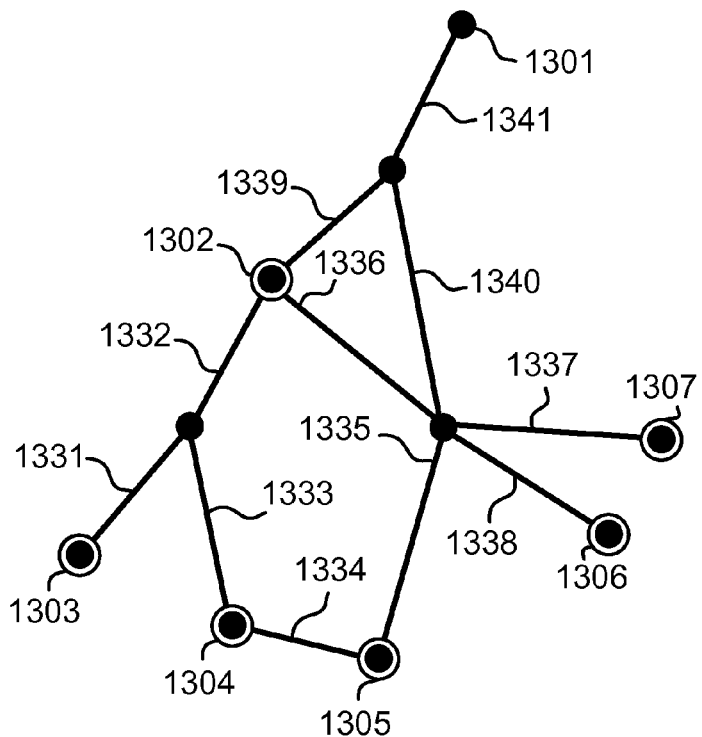
FIG. 13A illustrates one embodiment of a backhaul aware Radio Access Network (RAN)
Figure 13B:
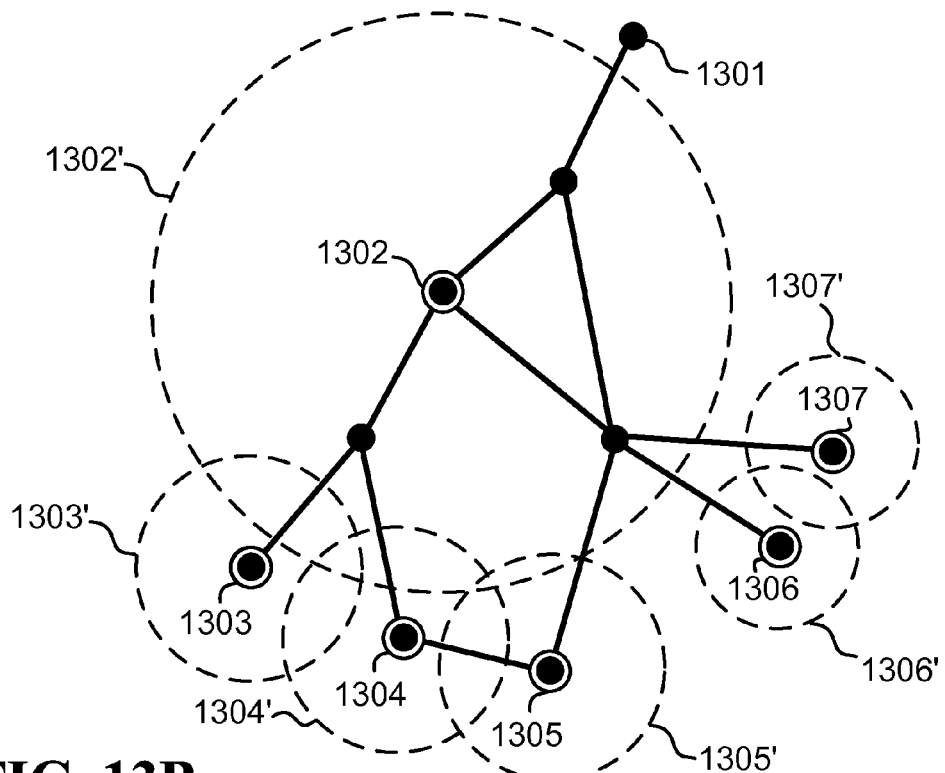
FIG. 13B illustrates one embodiment of a backhaul aware Radio Access Network (RAN)

FIG. 13A and FIG. 13B illustrate one embodiment of a backhaul aware RAN. Radio Access nodes 1302, 1303, 1304, 1305, 1306, 1307 are interconnected by data links 1331, 1332, 1333, 1334, 1335, 1336, 1337, 1338, 1339, 1340, and 1341 belonging to a backhaul system. The Radio Access nodes 1302, 1303, 1304, 1305, 1306, 1307 provide wireless communication to mobile devices (not illustrated), and may have coverage areas illustrated by elements 1302', 1303', 1304', 1305', 1306', 1307' respectively. The other illustrated nodes are relay nodes, capable of relying data between Radio Access nodes via data links connected to them. Some of the Radio Access nodes function as relay nodes as well. As an example, Radio Access node 1304 may relay data incoming via data link 1333 to Radio Access node 1305, via data link 1334. The backhaul system identifies paths interconnecting pairs of Radio Access nodes. Path 1331+1333 connects Ratio Access nodes 1303 and 1304, path 1334 connects Radio Access nodes 1304 and 1305, path 1331+1332 connects Radio Access nodes 1303 and 1302, path 1333+1332 connects Radio Access nodes 1304 and 1302, paths 1334+1333+

1332 and path 1335+1336 both connect Radio Access nodes 1305 and 1302, and path 1338+1337 connects Radio Access nodes 1306 and 1307. The backhaul system ascertains Traffic Engineering (TE) metrics associated with the paths. TE metric may include one or more of the following: (i) data capacity of the path, (ii) latency of the path, or (iii) unutilized data capacity for sending data between Radio Access nodes over the path. The backhaul system conveys the TE metrics of the paths to the Radio Access nodes connected by the paths. By way of example, the backhaul system ascertains that path 1331+1333 connecting Radio Access nodes 1303 and 1304 has a data capacity of 100 Mbps. The TE metric associated with the 100 Mbps data capacity is conveyed to Radio Access nodes 1303 and 1304. Then, as an example, when Radio Access node 1303 initiates a handover of a mobile station to Radio Access node 1304 (possibly when the mobile station traverses from reception area 1303' into reception area 1304'), Radio Access node 1303 checks the TE metric of path 1331+1333. Since the TE metric is 100 Mbps, which, by way of example, is sufficient to allow a soft handover, Radio Access node 1303 initiates a soft handover instead of a regular handover. In case of a TE metric indicating insufficient bandwidth to support soft handover, the result is a regular handover, which does not require substantial backhaul bandwidth. In a case that a path interconnecting a pair of Radio Access nodes comprises two or more data links joined by a relay node, which is the case with path 1331+1333 comprising data links 1331 and 1333, the TE metric associated with data capacity may be calculated by determining the data link having the lowest capacity. By way of example, if data link 1331 has a data capacity of 200 Mbps and data link 1333 has a data capacity of 100 Mbps, then the data capacity of the path 1331+1333 is 100 Mbps. In other cases, a similar process is performed in association with other features such as macro-diversity. A macro diversity transmission is invoked by a Radio Access node requiring the macro-diversity transmission, only if a TE metric indicates that a sufficient data capacity is available from the Radio Access node that made the requirement, to a Radio Access node involved in the requirement for macro-diversity transmission, over a path connecting them. Radio Access node 1302 may require that Radio Access node 1304 participate in a macro-diversity transmission to a mobile station located at a point covered by both coverage areas 1302' and 1304'. In this case, node 1302 verifies that a TE metric associated with path 1332+1333 permits such a macro-diversity transmission. If so permitted, node 1302 sends macro-diversity transmission data in real-time to node 1304 via path 1332+1333, and both Radio Access nodes 1302, 1304 may then start macro-diversity transmission.

In one embodiment, at least some of the paths comprise at least one wireless data link, which is subject to changing conditions, causing the TE metrics to change from time to time. The TE metrics are conveyed, from time to time, to the Radio Access nodes. By way of example, data link 1334 is a wireless data link having a maximum data capacity of 1 Gbps. At first, the wireless data link 1334 is at full data capacity, and this fact is conveyed to Radio Access nodes 1304 and 1305. Radio Access nodes 1304 and 1305 can now invoke features requiring real-time data exchange via wireless data link 1334. At a certain point in time, the data capacity of wireless data link 1334 is reduced to 50 Mbps, possibly due to atmospheric conditions such as rain. The reduced data capacity is conveyed by the backhaul system to Radio Access nodes 1304 and 1305. Consequently, the Radio Access nodes 1304 and 1305 disable features requiring real-time data capacity in excess of 50 Mbps. The backhaul system sends TE metrics updates to the Radio Access nodes 1304 and 1305 from time to time. The TE metrics updates may be done periodically, or as a response to a trigger such as changing backhaul system conditions. Ascertaining and conveying TE metrics may be performed by a component of the backhaul system such as a relay node, a control server, or other entity associated with backhauling, operative to communicate with Radio Access nodes, and having access to TE metrics.

In one embodiment, the TE metric is data capacity of a path. In one embodiment, the TE metric is latency of a path. In one embodiment, the TE metric is the unutilized data capacity remaining in a path. The path 1332+1333 comprises the data link 1332.

By way of example, data link 1332 transports data from Radio Access node 1301, which may be a gateway node, to Radio Access nodes 1303 and 1304 at a rate of 70 Mbps, and has a data capacity of 100 Mbps. The unutilized data capacity of data link 1332 is therefore 30 Mbps. Data link 1333 has a capacity of 100 Mbps, and is currently not utilized at all. The unutilized bandwidth of data path 1332+1333 is therefore the minimum of 30 Mbps and 100 Mbps, which is 30 Mbps.

In one embodiment, the decision to invoke an operation is made by comparing a TE metric with a threshold. If, as an example, the data capacity of a path is above a threshold X, then an operation requiring real-time data exchange will be invoked. Otherwise, the operation will be suppressed or deferred.

In one embodiment, the paths are identified only for pairs of Radio Access nodes having an overlapping cell coverage area. By way of example, Radio Access nodes 1306 and 1307 have coverage areas 1306' and 1307' respectively, which overlap. It is therefore beneficial to identify path 1338+1337, ascertain TE metrics of path 1338+1337, and convey the TE metric to Radio Access nodes 1306 and 1307. However, since Radio Access nodes 1306 and 1307 do not share coverage area with other nodes, it is not necessary to identify paths connecting Radio Access nodes 1306 and 1307 to the other Radio Access nodes, at least not in the context of soft handover, which requires coverage areas which overlap between involved Radio Access nodes.

In one embodiment, a Radio Access node belongs to more than one pair of Radio Access nodes, and is therefore conveyed with TE metrics of more than one path associated with the Radio Access node. By way of example, Radio Access node 1304 is conveyed with TE metrics associated with paths 1331+1333, 1332+1333, and 1334, as it is paired with Radio Access nodes 1303, 1302, and 1305.

In one embodiment, at least some of the paths comprise wireless data links. In one embodiment, all the paths comprise wireless data links. In one embodiment, all the data links are wireless data links.

In one embodiment, a method for communicating between two Radio Access nodes includes the following steps: Ascertaining, by a backhaul system, from time to time, at least one type of Traffic Engineering (TE) metric associated with transporting data between a pair of Radio Access nodes over a path belonging to the backhaul system. Conveying the TE metric to the pair of Radio Access nodes, by the backhaul system. And upon requirement, of one of the Radio Access nodes of the pair, to invoke an operation associated with communicating real-time data between the Radio Access nodes of the pair, deciding, by the Radio Access node that made the requirement, to invoke the operation, provided that the TE metric conveyed to the requiring Radio Access node indicates that such real-time data communication is viable over the path.

In one embodiment of a backhaul aware RAN, a backhaul system ascertains, from time to time, at least one type of Traffic Engineering (TE) metric associated with transporting data between a pair of Radio Access nodes over a path connecting the Radio Access nodes. The backhaul system conveys the TE metric to the pair of Radio Access nodes. Upon requirement, of one of the Radio Access nodes of the pair, to invoke an operation associated with communicating real-time data between the Radio Access nodes of the pair, the requiring Radio Access node of the pair decides to invoke the operation, provided that the TE metric conveyed to the requiring Radio Access node indicates that such real-time data communication is viable over the path.

In one embodiment, a system for communicating between Radio Access nodes includes a Radio Access Network (RAN) comprising a plurality of Radio Access nodes and a backhaul system interconnecting the Radio Access nodes. The backhaul system identifies at least some paths belonging to the backhaul system, each path interconnecting a pair of Radio Access nodes belonging to the RAN. The backhaul system ascertains, from time to time, per path, at least one type of Traffic Engineering (TE) metric associated with transporting data between a pair of Radio Access nodes interconnected by the path, and convey, per path, the TE metric, to the pair of Radio Access nodes interconnected by the path. Optionally, the pair of Radio Access nodes perform a real-time data exchange, provided that the TE metric conveyed to one of the Radio Access node of the pair and associated with a path interconnecting the pair of Radio Access nodes, indicates that such an exchange is viable using the path.

Figure 14:
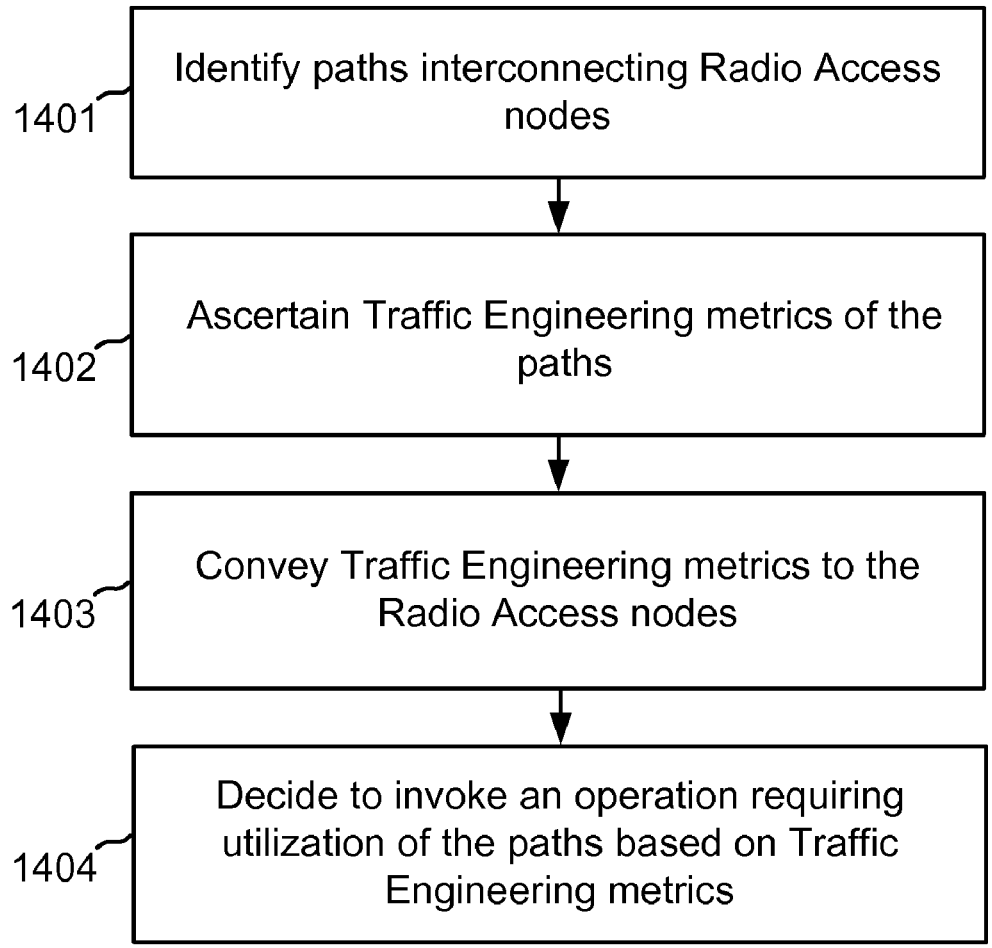
FIG. 14 illustrates a flow diagram describing one method for communicating between Radio Access nodes.

FIG. 14 illustrates a flow diagram describing one method for communicating between Radio Access nodes, comprising the following steps: In step 1401, identifying at least some paths, each interconnecting a pair of Radio Access nodes belonging to a Radio Access Network (RAN). In step 1402, ascertaining, from time to time, per path, at least one type of Traffic Engineering (TE) metric associated with communicating real-time data between a pair of Radio Access nodes interconnected by the path. In step 1403, conveying, per path, the TE metric, to the pair of Radio Access nodes interconnected by the path. In step 1404, deciding to invoke an operation associated with communicating real-time data between the Radio Access nodes of the pair, provided that the TE metric conveyed to the Radio Access nodes indicates that such real-time data communication is viable over the path.

Figure 15:
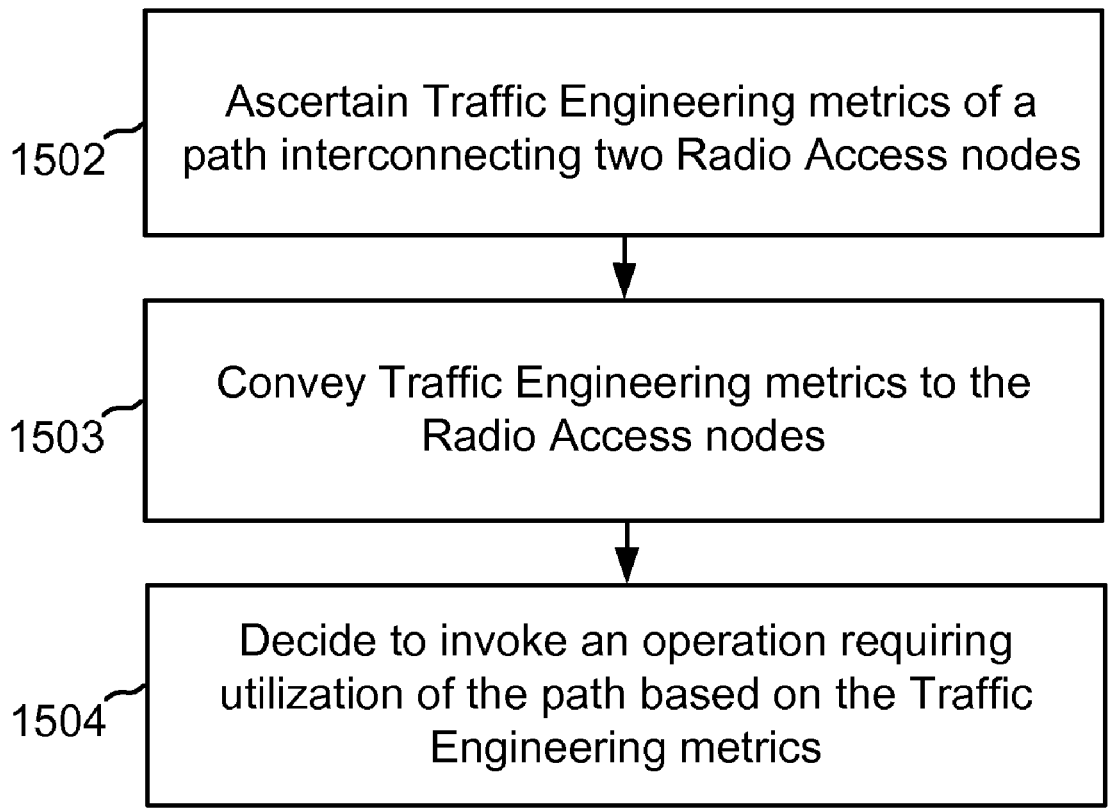
FIG. 15 illustrates a flow diagram describing one method for communicating between Radio Access nodes.

FIG. 15 illustrates a flow diagram describing one method for communicating between Radio Access nodes, comprising the following steps: In step 1502, ascertaining, by a backhaul system, from time to time, at least one type of Traffic Engineering (TE) metric associated with transporting data between a pair of Radio Access nodes over a path connecting the Radio Access nodes. In step 1503, conveying the TE metric to the pair of Radio Access nodes, by the backhaul system. In step 1504, deciding to invoke an operation associated with communicating real-time data between the Radio Access nodes, provided that the TE metric indicates that such real-time data communication is viable over the path.

In one embodiment, a system for fault-tolerant communication includes N nodes, out of which one is a gateway node, and N data links, each data link connecting two of the nodes, forming a ring structure comprising at least four nodes. At least two of the data links are wireless data links. The system substantially do not use one of the wireless data links to send data, effectively partitioning the ring structure into a first chain and a second chain, each chain connected to the gateway node. The system sends data downstream direction, from the gateway node, through the first and second chains, and sends data upstream direction, to the gateway node, through the first and second chains. The system detaches at least one node from the first chain, by substantially stop using a wireless data link having a reduction in performance and belonging to the first chain, and connects the at least one node to the second chain by starting to use the wireless data link that was substantially not in use. The at least one node that was detached and connected adjusts to the downstream direction and upstream direction of the second chain.

Figure 16A:
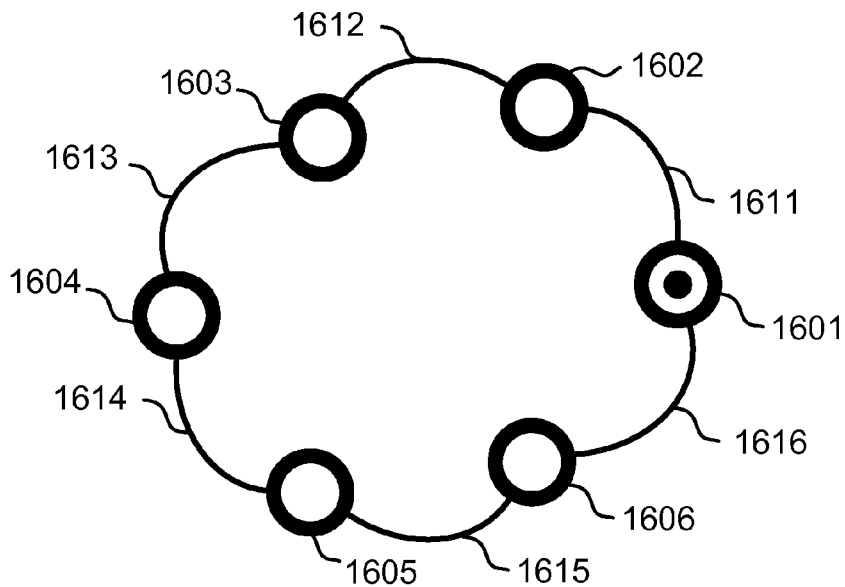
FIG. 16A illustrates a ring structure including nodes and data links.
Figure 16B:
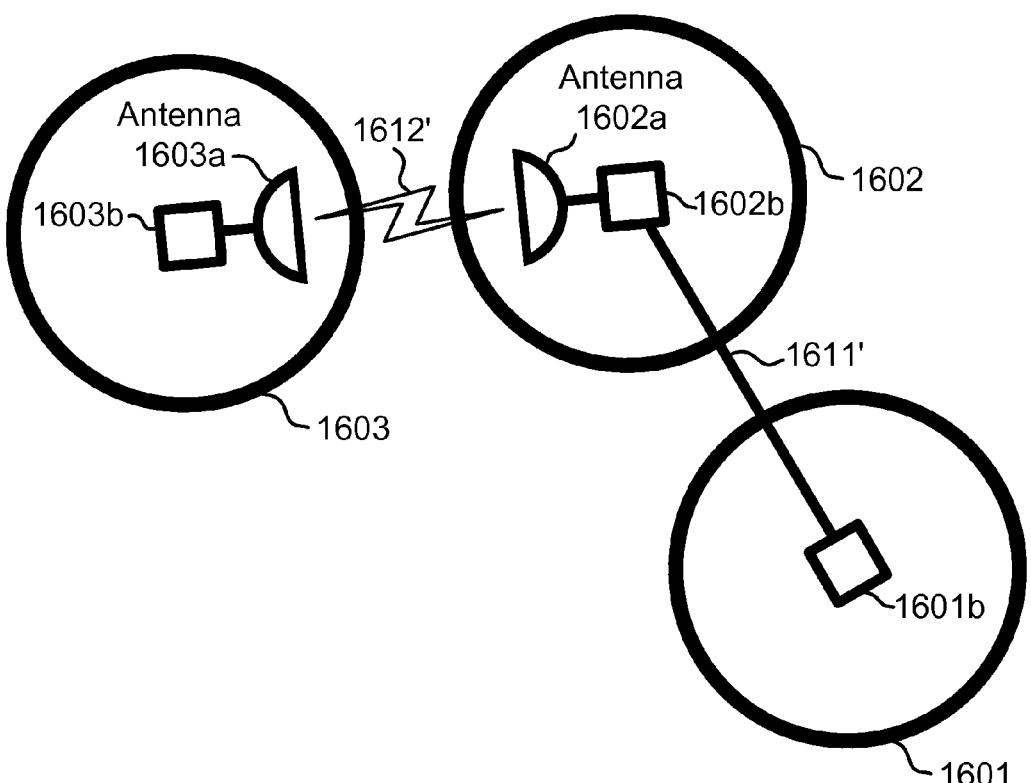
FIG. 16B illustrates a part of a ring structure comprising nodes and data links.

FIG. 16A and FIG. 16B illustrate one embodiment of a system for fault-tolerant communication. FIG. 16B is a detailed illustration of some of the nodes illustrated in FIG. 16A. By way of example, the system includes 6 nodes 1601, 1602, 1603, 1604, 1605 and 1606, out of which one node is a gateway node 1601, and 6 data links 1611, 1612, 1613, 1614, 1615, 1616, each data link connecting two of nodes 1601, 1602, 1603, 1604, 1605 and 1606, forming a ring structure comprising the 6 nodes 1601, 1602, 1603, 1604, 1605 and 1606. At least two of the data links are wireless data links. By way of example, data link 1612 and data link 1614 are wireless data links. In one embodiment, wireless data link 1612 includes a first transceiver 1603*b* connected to a first antenna 1603*a*, communicating with a second transceiver 1602*b* connected to a second antenna 1602*a*, using a wireless signal 1612'. The wireless signal 1612' is used bi-directionally, and transports data downstream as well as upstream. It is noted that transporting both downstream and upstream data may be simultaneously achieved with transceivers 1603*b*, 1602*b*, using techniques such as Time Division Duplex (TDD) or Frequency Division Duplex (FDD). In one embodiment, data link 1611 includes a second transceiver 1602*b* connected to communicating with a third transceiver 1601*b*, using a cable 1611' such as Ethernet cable. Cable 1611' is used bi-directionally, and transports data downstream as well as upstream. It is noted that transporting both downstream and upstream data may be simultaneously achieved with transceivers 1602*b*, 1601*b*, using data interfaces such as Ethernet or Asynchronous Transfer Mode (ATM).

Figure 17A:
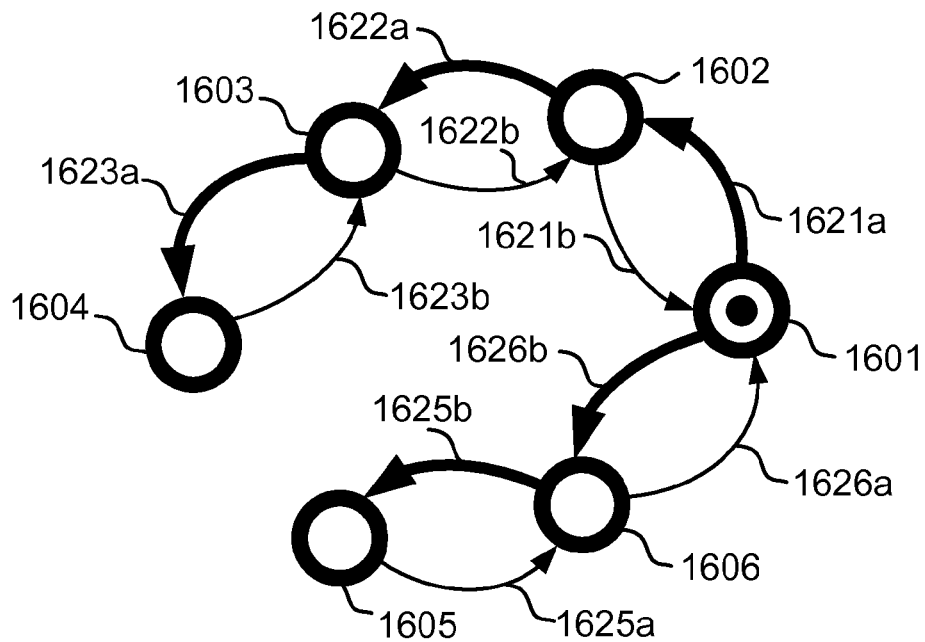
FIG. 17A illustrates a ring structure including nodes and data links, and one wireless data link substantially not used to send data.
Figure 17B:
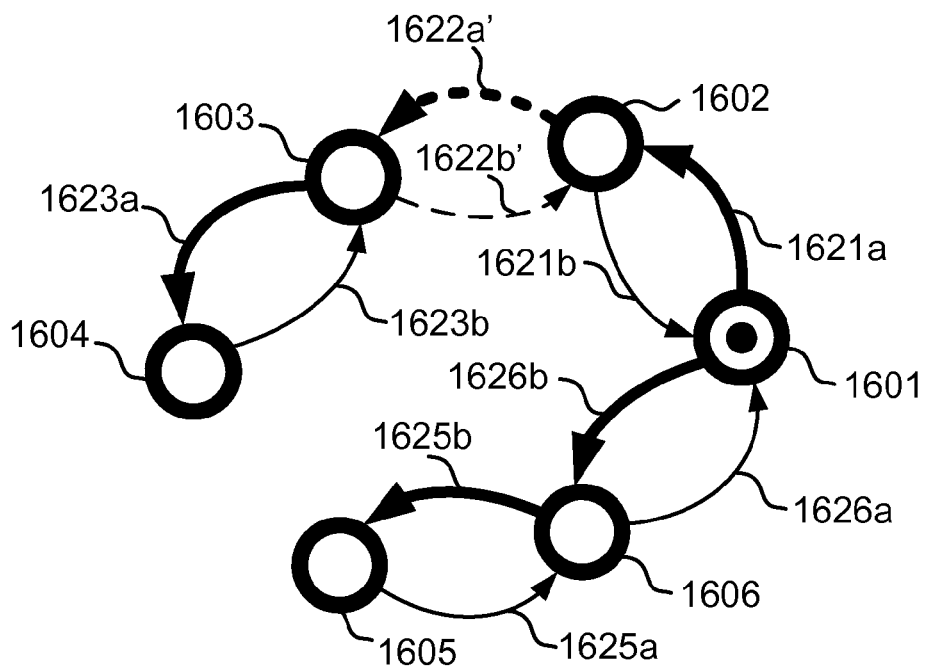
FIG. 17B illustrates a ring structure including nodes and data links, and one wireless data link substantially not used to send data.
Figure 17C:
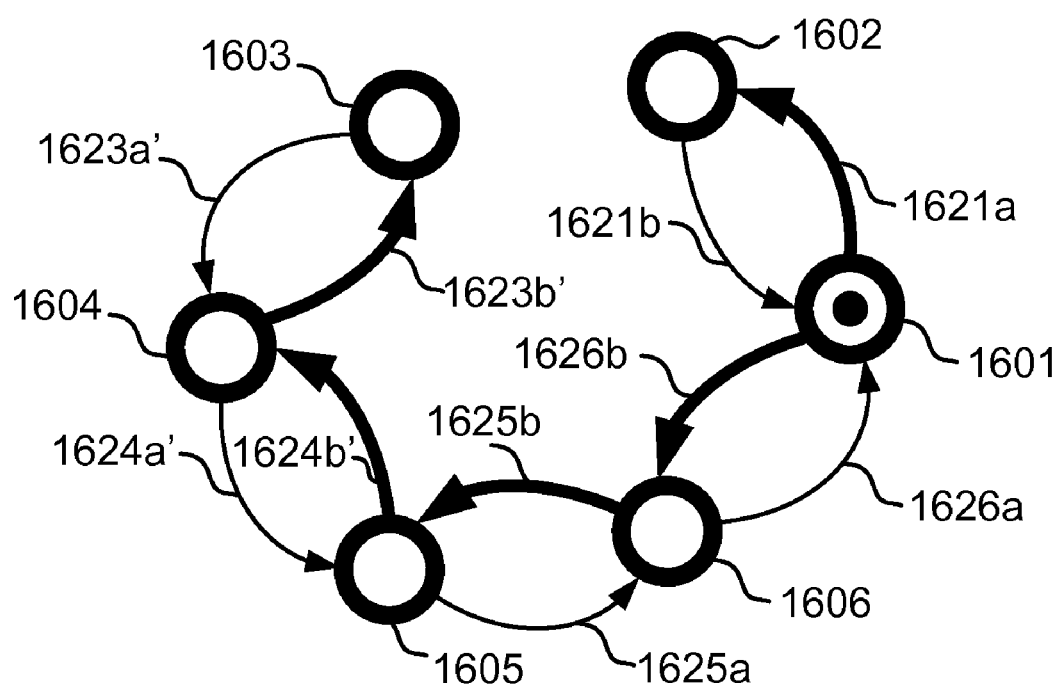
FIG. 17C illustrates a ring structure including nodes and data links, and one wireless data link substantially not used to send data.

FIG. 17A, FIG. 17B, and FIG. 17C illustrate one embodiment of a system for fault-tolerant communication, including one wireless data link substantially not used to send data. It is noted that data links 1611, 1612, 1613, 1614, 1615, 1616 are not illustrated in FIG. 17A, FIG. 17B, and FIG. 17C. However, data links 1611, 1612, 1613, 1614, 1615, 1616 still connect nodes 1601, 1602, 1603, 1604, 1605 and 1606 as illustrated in FIG. 16A. By way of example, the system substantially do not use wireless data link 1614, connecting nodes 1604 and 1605, to send data, effectively partitioning the ring structure into a first chain comprising nodes 1601, 1602, 1603, 1604 and a second chain comprising nodes 1601, 1606, 1605. Each chain connected to the gateway node 1601, and starts at the gateway node 1601. The system sends data downstream direction, from the gateway node 1601, through the first and second chains, and sends data upstream direction, to the gateway node 1601, through the first and second chains. Data flow 1621*a* propagates data downstream direction from gateway node 1601 to node 1602 over data link 1611. Data flow 1622*a* propagates data downstream direction from node 1602 to node 1603 over wireless data link 1612. Data flow 1623*a* propagates data downstream direction from node 1603 to node 1604 over data link 1613. Data flow 1626*b* propagates data downstream direction from gateway node 1601 to node 1606 over data link 1616. Data flow 1625*b* propagates data downstream direction from node 1606 to node 1605 over data link 1615. Data flow 1623*b* propagates data upstream direction from node 1604 to node 1603 over data link 1613. Data flow 1622*b* propagates data upstream direction from node 1603 to node 1602 over wireless data link 1612. Data flow 1621*b* propagates data upstream direction from node 1602 to node gateway node 1601 over data link 1611. Data flow 1625a propagates data upstream direction from node 1605 to node 1606 over data link 1615. Data flow 1626a propagates data upstream direction from node 1606 to node gateway node 1601 over data link 1616.

The system detaches node 1603 and node 1604 from the first chain, by substantially stop using wireless data link 1612 having a reduction in performance and belonging to the first chain, and connects node 1603 and node 1604 to the second chain by starting to use wireless data link 1614 that was substantially not in use. Node 1603 and node 1604 adjusts to the downstream direction and upstream direction of the second chain. The reduction in performance of wireless data link 1612 is illustrated by data flow 1622a' and data flow 1622b'. In one embodiment, as a result of the reduction in performance of wireless data link 1612, data flow 1622a' propagates less data than data flow 1622a, and data flow 1622b' propagates less data than data flow 1622b. After the system substantially stops using wireless data link 1612, and starting to use wireless data link 1614, node 1603 and node 1604 adjust to the downstream direction and upstream direction of the second chain, by (i) establishing data flow 1624b' to propagate data downstream direction from node 1605 to node 1604 over wireless data link 1614, (ii) establishing data flow 1623b' to propagate data downstream direction from node 1604 to node 1603 over data link 1613, (iii) establishing data flow 1623a' to propagate data upstream direction from node 1603 to node 1604 over data link 1613, and (iv) establishing data flow 1624a' to propagate data upstream direction from node 1604 to node 1605 over wireless data link 1614. It is noted that after the system substantially stops using wireless data link 1612, and starting to use wireless data link 1614, the first chain originally comprising nodes 1601, 1602, 1603, 1604 is reduced to a first chain comprising only nodes 1601 and 1602, while the second chain originally comprising nodes 1601, 1606, 1605 is augmented to a second chain comprising nodes 1601, 1606, 1605, 1604, 1603. In one embodiment, all the data links 1611, 1612, 1613, 1614, 1615, 1616 are wireless data links.

In one embodiment, the wireless data link having the reduction in performance is a data link previously sustaining a first data rate, and currently sustaining only a second data rate as a result of an event. Optionally, the second data rate is less than 80% of the first data rate. According to one example, wireless data link 1612 as an original data rate capacity of 800 Mbps downstream, and 200 Mbps upstream. Wireless data link 1612 is identified as having a reduction in performance when the downstream data rate capacity of wireless data link 1612 drops below 640 Mbps.

In one embodiment, the wireless data 1612 link having the reduction in performance is a millimeter-wave data link connecting node 1602 and node 1603. Optionally, the millimeter-wave data link includes two directional antennas 1603a, 1602a located at the two of the nodes 1603, 1602 respectively, and the two directional antennas 1603a, 1602a have a line of sight with each-other.

In one embodiment, the millimeter-wave data link operates at a frequency between 57 GHz and 86 GHz. In one embodiment, the event causing data 1612 link to have the reduction in performance is an atmospheric event, such as fog, rain, or dust. In one embodiment, the event is a malfunction in one of the nodes 1602, 1603 operating wireless data link 1612 having the reduction in performance. In one embodiment, the malfunction causes data link 1612 to become inoperative.

In one embodiment, the wireless data links 1612, 1614 are used asymmetrically, such that the downstream direction is allocated with more wireless communication bandwidth than the upstream direction. In one embodiment, the wireless data links 1612, 1614 use Time Division Duplex (TDD), and the downstream direction is allocated more transmission time than the upstream direction.

In one embodiment, the at nodes 1603, 1604 that were detached from the first chain and connected to the second chain adjusts to the downstream direction and upstream direction of the second chain, by allocating the downstream direction of the second chain more transmission time than the upstream direction of the second chain.

In one embodiment, each of the data links 1611, 1612, 1613, 1614, 1615, 1616 is used asymmetrically, by propagating data downstream at a higher data rate than propagating data upstream. In such a case, it is noted that after the system substantially stops using wireless data link 1612, and starting to use wireless data link 1614, node 1603 and node 1604 reverse the asymmetry of data links associated with node 1603 and node 1604. This is demonstrated as follows: node 1603 originally sends data downstream to node 1604 using data flow 1623a, and node 1604 originally sends data upstream to node 1603 using data flow 1623b. As an example, data flow 1623a originally has a downstream data transmission rate of 100 Mbps, and data flow 1623b originally has an upstream data transmission rate of 20 Mbps. After the system substantially stops using wireless data link 1612, and starting to use wireless data link 1614, data flow 1623a is reduced to data flow 1623a' having an upstream data transmission rate of 20 Mbps, and data flow 1623b is enhanced to data flow 1623b' having a downstream data transmission rate of 100 Mbps.

In one embodiment, the nodes 1601, 1602, 1603, 1604, 1605 and 1606 are backhaul nodes, delivering data to Radio Access nodes belonging to a Radio Access Network (RAN). In one embodiment, the wireless data links 1612, 1614 are millimeter-wave Point-to-Point links.

In one embodiment, the system continues working at substantially full capacity after any first malfunction affecting any of data links 1611, 1612, 1613, 1614, 1615, 1616 or any of the wireless data links 1612, 1614.

In one embodiment, the system selects one of the wireless data links to be substantially not in use by comparing wireless performance of all the wireless data links, and substantially stop using the wireless data link having the worse wireless communication performance. According to one example, wireless data link 1612 has a data rate capacity of 500 Mbps, and wireless data link 1614 has a data rate capacity of 200 Mbps. Therefore, wireless data link 1614 is selected as the one wireless data links to be substantially not in use. In one embodiment, the wireless performance may be data transmission rate, packet loss, latency, or latency jitter.

In one embodiment, the selection is done periodically. In one embodiment, the period is 1 second. In one embodiment the period is 100 milliseconds. In one embodiment the period is 10 milliseconds. In one embodiment the period is 1 milliseconds.

In one embodiment, the ring structure includes at least 3 nodes, and the first chain includes only the gateway node after detaching the at least one node from the first chain. In one embodiment, the ring structure includes at least 3 nodes, and the second chain includes only the gateway node before detaching the at least one node from the first chain.

In one embodiment, a method for achieving fault-tolerant communication includes (i) operating a ring structure having N nodes out of which one is a gateway node, and N data links each data link connecting two of the nodes, forming the ring structure, wherein at least two of the data links are wireless data links, (ii) substantially not using one of the wireless data links to send data, effectively partitioning the ring structure into a first chain and a second chain, each chain connected to the gateway node, (iii) sending data downstream direction, from the gateway node, through the first and second chains, (iv) sending data upstream direction, to the gateway node, through the first and second chains, (v) detaching at least one node from the first chain, by substantially stop using a wireless data link having a reduction in performance and belonging to the first chain, (vi) connecting the at least one node to the second chain by starting to use the wireless data link that was substantially not in use, and (vii) adjusting the at least one node, which was detached and connected, to the downstream direction and upstream direction of the second chain.

Figure 18:
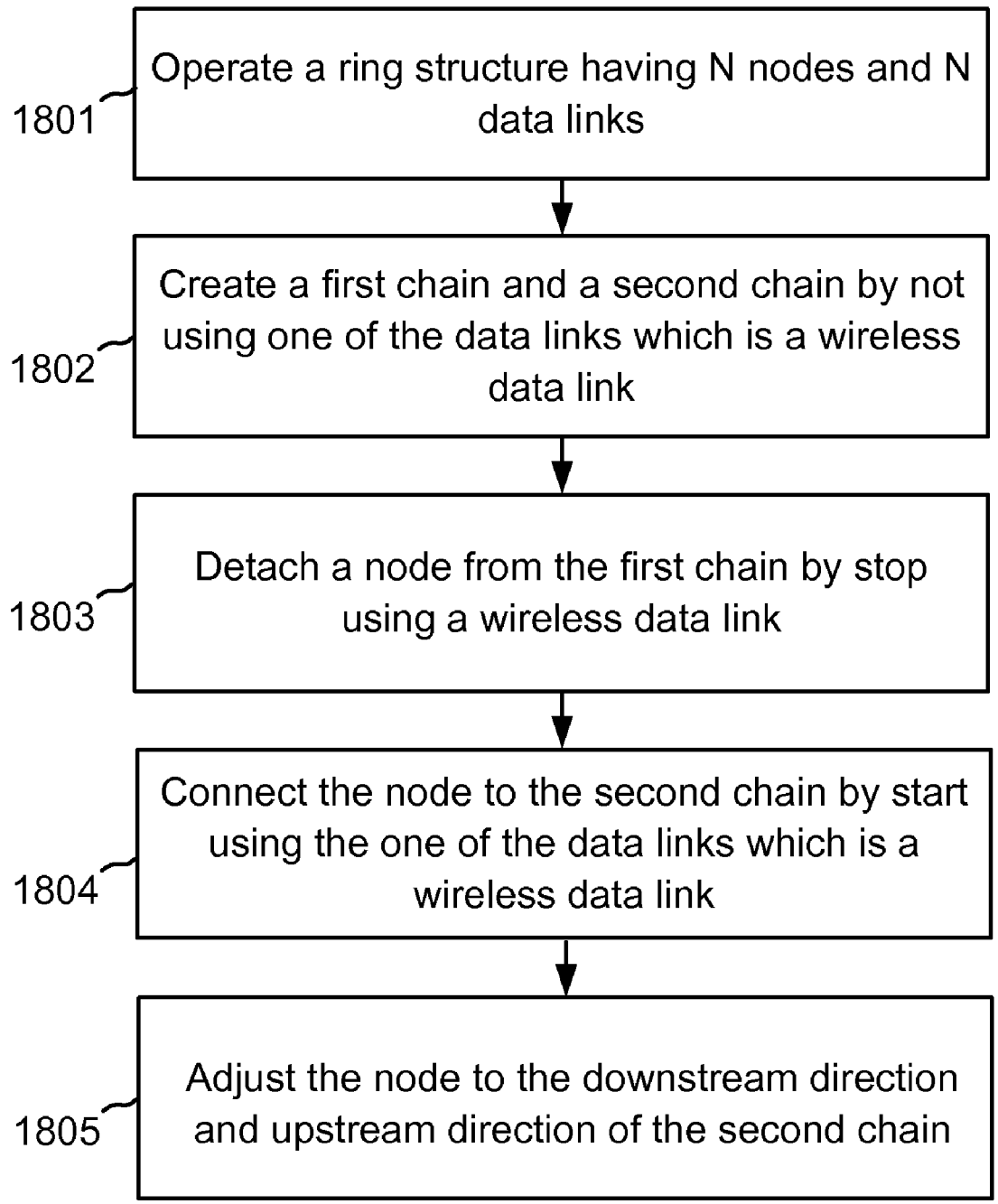
FIG. 18 illustrates a flow diagram describing one method for fault-tolerant communication.

FIG. 18 illustrates a flow diagram for achieving fault-tolerant communication, including the following steps: In step 1801, operating a ring structure having N nodes out of which one is a gateway node, and N data links each data link connecting two of the nodes, forming the ring structure, wherein at least two of the data links are wireless data links. In step 1802, substantially not using one of the wireless data links to send data, effectively partitioning the ring structure into a first chain and a second chain, each chain connected to the gateway node. In step 1803, detaching at least one node from the first chain, by substantially stop using a wireless data link having a reduction in performance and belonging to the first chain. In step 1804, connecting the at least one node to the second chain by starting to use the wireless data link that was substantially not in use. On step 1805, adjusting the at least one node, which was detached and connected, to the downstream direction and upstream direction of the second chain.

In this description, numerous specific details are set forth. However, the embodiments of the invention may be practiced without some of these specific details. In other instances, well known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A system for fault-tolerant communication, comprising:
   N nodes, out of which one is a gateway node;
   N data links, each data link connecting two of the nodes, forming a ring structure comprising at least four nodes, wherein at least two of the data links are wireless data links;
   the system is configured to not use one of the wireless data links to send data, effectively partitioning the ring structure into a first chain and a second chain, each chain connected to the gateway node;
   the system is further configured to send data downstream direction, from the gateway node, through the first and second chains, and send data upstream direction, to the gateway node, through the first and second chains; and
   the system is further configured to detach at least one node from the first chain, by stop using a wireless data link having a reduction in performance and belonging to the first chain, and connect the at least one node to the second chain by starting to use the wireless data link that was not in use;
   wherein the at least one node that was detached and connected is configured to adjust to the downstream direction and upstream direction of the second chain.

2. The system of claim 1, wherein all the data links are wireless data links.

3. The system of claim 1, wherein the wireless data link having the reduction in performance is a data link previously sustaining a first data rate, and currently sustaining only a second data rate as a result of an event, wherein the second data rate is less than 80% of the first data rate.

4. The system of claim 3, wherein the wireless data link having the reduction in performance is a millimeter-wave data link connecting two of the nodes, wherein the millimeter-wave data link comprises two directional antennas located at the two of the nodes, and the two directional antennas have a line of sight with each-other.

5. The system of claim 4, wherein the millimeter-wave data link operates at a frequency between 57 GHz and 86 GHz.

6. The system of claim 5, wherein the event is an atmospheric event selected from a group including fog, rain, and dust.

7. The system of claim 3, wherein the event is a malfunction in one of the nodes operating the wireless data link having the reduction in performance.

8. The system of claim 7, wherein the malfunction causes the data link having the reduction in performance to become inoperative.

9. The system of claim 1, wherein the wireless data links are used asymmetrically, such that the downstream direction is allocated with more wireless communication bandwidth than the upstream direction.

10. The system of claim 9, wherein the wireless data links use Time Division Duplex (TDD), and the downstream direction is allocated more transmission time than the upstream direction.

11. The system of claim 10, wherein the at least one node that was detached from the first chain and connected to the second chain is configured to adjust to the downstream direction and upstream direction of the second chain, by allocating the downstream direction of the second chain more transmission time than the upstream direction of the second chain.

12. The system of claim 1, wherein the nodes are backhaul nodes, delivering data to Radio Access nodes belonging to a Radio Access Network (RAN).

13. The system of claim 12, wherein the wireless data links are millimeter-wave Point-to-Point links.

14. The system of claim 13, wherein the system is configured to continue working at substantially full capacity after any first malfunction affecting any of the data links or any of the wireless data links.

15. The system of claim 1, wherein the system is further configured to select the one of the wireless data links that is not in use by comparing wireless performance of all the wireless data links, and stop using the wireless data link having the worse wireless communication performance.

16. The system of claim 15, wherein the wireless performance is selected from a group including data transmission rate, packet loss, latency, and latency jitter.

17. The system of claim 15, wherein the selection is done periodically.

18. The system of claim 1, wherein the ring structure comprises at least 3 nodes, and the first chain comprises only the gateway node after detaching the at least one node from the first chain.

19. The system of claim 1, wherein the ring structure comprises at least 3 nodes, and the second chain comprises only the gateway node before detaching the at least one node from the first chain.

20. A method for achieving fault-tolerant communication, comprising:
- operating a ring structure comprising N nodes out of which one is a gateway node, and N data links each data link connecting two of the nodes, forming the ring structure, wherein at least two of the data links are wireless data links;
- not using one of the wireless data links to send data, effectively partitioning the ring structure into a first chain and a second chain, each chain connected to the gateway node;
- sending data downstream direction, from the gateway node, through the first and second chains;
- sending data upstream direction, to the gateway node, through the first and second chains;
- detaching at least one node from the first chain, by stop using a wireless data link having a reduction in performance and belonging to the first chain;
- connecting the at least one node to the second chain by starting to use the wireless data link that was substantially not in use; and
- adjusting the at least one node, which was detached and connected, to the downstream direction and upstream direction of the second chain.

* * * * *